United States Patent
Chevalier et al.

(10) Patent No.: US 12,036,693 B2
(45) Date of Patent: Jul. 16, 2024

(54) BOARD POSITIONING SYSTEM AND METHOD

(71) Applicant: Palletec, LLC, Fridley, MN (US)

(72) Inventors: Mark Wayne Chevalier, Blaine, MN (US); Kent Carlyle Johnson, Elk River, MN (US); Ryan Michael McCarthy, Maplewood, MN (US); John Jordan Vukelich, St. Paul, MN (US); Bernard Claydean Hancock, III, Elk River, MN (US)

(73) Assignee: PALLETEC, LLC, Fridley, MN (US)

( * ) Notice: Subject to any disclaimer, the term of this patent is extended or adjusted under 35 U.S.C. 154(b) by 634 days.

(21) Appl. No.: 17/321,261

(22) Filed: May 14, 2021

(65) Prior Publication Data

US 2022/0362964 A1 Nov. 17, 2022

(51) Int. Cl.
*B27M 3/00* (2006.01)
*B65G 43/08* (2006.01)

(52) U.S. Cl.
CPC ............. *B27M 3/004* (2013.01); *B65G 43/08* (2013.01)

(58) Field of Classification Search
CPC ............................... B27M 3/004; B65G 43/08
USPC .......................................................... 227/39
See application file for complete search history.

(56) References Cited

U.S. PATENT DOCUMENTS

| | | | | |
|---|---|---|---|---|
| 3,844,466 A | * | 10/1974 | Narita | B27M 3/0073 227/40 |
| 3,968,560 A | * | 7/1976 | Vial | B27M 3/0073 29/430 |
| 4,039,111 A | * | 8/1977 | Rogers | B27F 7/02 227/101 |
| 4,403,388 A | * | 9/1983 | Belcher | B27M 3/0073 227/7 |
| 4,793,540 A | * | 12/1988 | Mangan | B27M 3/0073 227/39 |
| 4,967,948 A | * | 11/1990 | Allspaw | B27M 3/0073 227/7 |
| 5,058,795 A | * | 10/1991 | Tonus | B27M 3/0073 227/111 |
| 5,095,605 A | * | 3/1992 | Tonus | B27F 7/003 227/7 |
| 5,249,352 A | * | 10/1993 | Landers | B27M 3/0073 227/111 |
| 5,555,617 A | * | 9/1996 | Pope | B27M 3/0073 269/910 |
| 6,176,009 B1 | * | 1/2001 | Inman | B27M 3/0073 29/772 |
| 6,499,206 B1 | * | 12/2002 | Eure | B27M 3/0073 29/430 |
| 6,763,567 B2 | * | 7/2004 | Smith | B27M 3/0073 29/430 |

FOREIGN PATENT DOCUMENTS

| | | | | |
|---|---|---|---|---|
| EP | 4230371 A1 | * | 8/2023 | ............ B27D 5/006 |
| EP | 4234451 A2 | * | 8/2023 | ........... B23Q 7/1426 |
| EP | 4272919 A1 | * | 11/2023 | ............ B23Q 1/037 |

* cited by examiner

*Primary Examiner* — Eyamindae C Jallow
(74) *Attorney, Agent, or Firm* — Cozen O'Connor

(57) ABSTRACT

Automated assembly of a pallet includes advancement of a subject board from a source location to a queue position. The subject board is moved from the queue position to a fastening position by a positioner. Advancement of the subject board occurs while the positioner is in motion between the queue position and the fastening position.

22 Claims, 16 Drawing Sheets

BOARD POSITIONING SYSTEM AND METHOD

TECHNICAL FIELD

The present application generally relates industrial manufacturing machinery and processes and, more particularly, to systems and methods for manufacturing pallets from boards.

BACKGROUND

Pallets are assembled platforms widely used in shipping, handling, and storage of goods. Pallets are typically formed of a set of spaced-apart, parallel boards referred to as "stringers" that are connected by a set of spaced-apart, parallel deck boards that are situated perpendicularly to the stringers. A pallet has at least one deck in which deck boards are fastened to one side of the stringers. More commonly, deck boards are attached to both sides of the stringers to form a two-deck pallet.

The boards may be of any suitable material, such as natural wood, or manufactured or recycled material, such as plywood, fiberboard, particle board, plastic, or composite material. The boards may be fasted by nails, screws, adhesive, or other suitable fastening provision.

In the manufacture of pallets, assembly speed and manufacturing-process uptime are paramount to minimizing the cost of production. There is a need for practical solutions that provide performance and reliability improvements over existing methods and machinery for pallet production.

SUMMARY

According to one aspect of this disclosure, a board positioning system (BPS) for use with a pallet assembly system includes a first hopper for holding boards to be fastened to a pallet under assembly, and a first positioner movable under the first hopper between a retracted position and an extended position. The first positioner is arranged to move a subject board from a queue position to a fastening position, wherein the fastening position is aligned with a fastening actuator operable to fasten the subject board to the pallet under assembly. The first hopper is arranged to advance the subject board at the queue position while the first positioner is in motion between the queue position and the fastening position and before the first positioner movably engages with the subject board. The queue position is on a surface of the first positioner, and the first positioner, when at the queue position, is to movably engage with the subject board and to initiate movement of the subject board to the fastening position.

A machine-implemented method for automatically assembling a pallet according to a related aspect includes: placing a subject board from a source location to a queue position, and moving the subject board from the queue position to a fastening position by a positioner. At the fastening position the subject board is fastened to a pallet under assembly. Placing the subject board occurs while the positioner is in motion between the queue position and the fastening position. The queue position may be on a surface of the positioner.

In a related aspect, a BPS includes a first hopper for holding boards to be fastened to a pallet under assembly, and a first positioner movable under the first hopper between a retracted position and an extended position, with the first positioner arranged to move a subject board from a queue position to a fastening position, wherein the fastening position is aligned with a fastening actuator operable to fasten the subject board to the pallet under assembly. The first hopper is arranged to advance the subject board at the queue position while the first positioner is in motion between the queue position and the fastening position and before the first positioner movably engages with the subject board. The first positioner, when at the queue position, is to movably engage with the subject board and to initiate movement of the subject board to the fastening position. The BPS further includes a sensor and a controller configured to monitor a positional movement condition of the subject board during advancement of the subject board at the queue position, and to permit initiation of the movement the subject board to the fastening position only in response to the positional movement condition meeting movement criteria.

In another related aspect, a machine-implemented method for automatically assembling a pallet includes placing a subject board from a source location to a queue position, and moving the subject board from the queue position to a fastening position by a positioner. At the fastening position the subject board is fastened to a pallet under assembly. During placing of the subject board to the queue position, a positional movement condition of the subject board is monitored, and the method computationally determines whether the positional movement condition meets defined movement criteria. Initiation of the movement the subject board from the queue position to the fastening position is permitted only in response to the meeting of the movement criteria by the positional movement.

BRIEF DESCRIPTION OF THE DRAWINGS

The invention may be more completely understood in consideration of the following detailed description of various embodiments of the invention in connection with the accompanying drawings.

Figure 1:
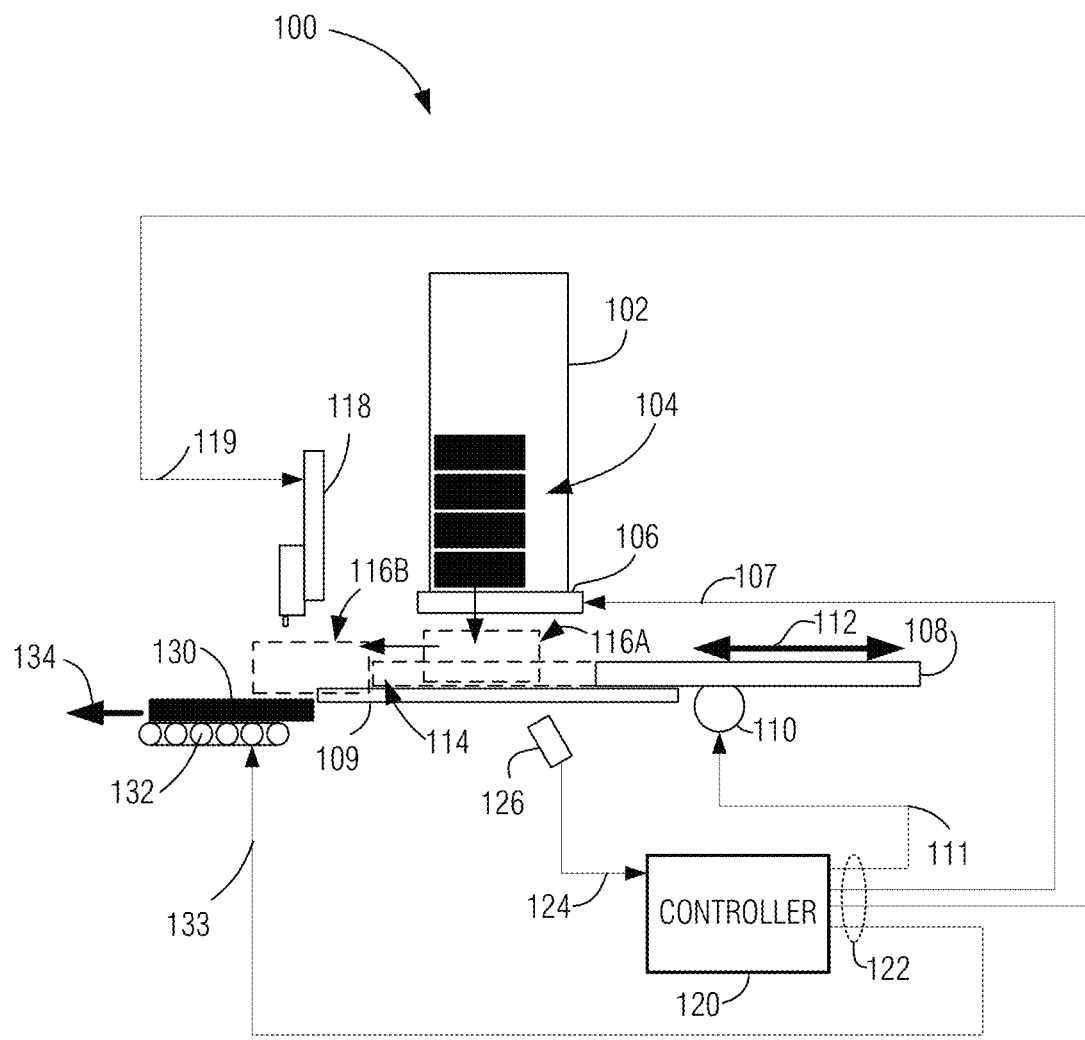
FIG. 1 is a schematic diagram illustrating a board positioning system (BPS) according to a simplified example.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Aspects of the present disclosure are generally directed to a board positioning system (BPS), and methods for operation of a BPS. The BPS may be used in an automated pallet assembly system (PAS) machine in two areas commonly referred to as M1 and M2. Area M1 of a PAS machine places boards on the bottom side of a pallet, whereas area M2 places boards on the top side of a pallet. For the sake of brevity, the assembly operations for only one area (either M1 or M2) of the PAS is described. It will be understood that similar functionality may be applied to assemble the other area, with suitable modifications made (such as positioning of the fastening subsystem on the opposite side, top instead of bottom, or vice-versa, of the pallet) to facilitate the assembly process.

As will be described in detail below, the BPS may include, or be interfaced with, a controller, which may be implemented in various embodiments, such as an embedded system, or as part of a computer system. A variety of computer system implementations bay be realized, such as using one physical machine, or distributed among multiple physical machines, such as by role or function, or by process thread in the case of a cloud computing distributed model. In various embodiments, aspects of the controller may be configured to run in virtual machines that in turn are executed on one or more physical machines. Thus, it will be understood by persons of skill in the art that features of the invention may be realized by a variety of different suitable machine implementations.

One aspect of the present disclosure relates to automated handling of boards by a BPS to move individual boards from one or more input hoppers to a fastening position where a fastening operation, such as nailing of each individual board, can take place according to some embodiments of the present subject matter.

FIG. 1 is a schematic diagram illustrating a BPS 100 according to a simplified example. BPS 100 includes board input hopper 102, which holds a plurality of boards 104. Gate mechanism 106 includes an actuator (not shown) operable to cause an actuated latch to advance (e.g., drop or place), individual boards 104 in response to actuation signal 107. In the example as depicted, boards 104 are released via gate mechanism 106 onto movable positioner 108. Positioner 108 is movable over slide plate 109 as represented by motion 112. In some embodiments, slide plate 109 is in a fixed position. Motion 112 of positioner 108 is reciprocating according to some implementations, shuttling between a retracted position as shown, and extended position 114, a portion of which is depicted in dashed lines. In operation, each individual board 104 is moved by positioner 108 from queued position 116A to fastening position 116B.

Positioner 108 is moved by actuator 110 in response to motion control signal 111. Actuator 110 may be implemented using a servo motor driving a rack-and-pinion linkage, as an example. In one such embodiment, the servo motor is driven by a variable-frequency motor drive circuit that controls the rates of acceleration and deceleration of the servo motor to limit or prevent slippage between board 104 and positioner 108. In one such implementation, the rates of acceleration and deceleration are programmed. These values may be predefined based on the size, weight, and material of boards 104.

In another implementation, a slippage sensor, which may be implemented using sensor 126 described below, or a separate sensor (not shown) may be used to determine the relative movement of board 104 and positioner 108 and thus assess any slippage therebetween. The slippage assessment may be fed back to the motor drive circuit to adjust the rates of acceleration and deceleration. The feedback control according to this example embodiment may permit the shuttling speed of positioner 108 to be maximized under the current conditions (e.g., humidity, dust/debris, etc.) while preventing slippage between board 104 and positioner 108, or limiting it to an acceptable degree.

Fastening position 116B is aligned with fastening actuator 118, which may be an automatic nailer, stapler, adhesive dispenser, screwdriver, or the like, according to several non-limiting examples. Each board 104 is precisely placed in fastening position 116B using a suitable stopping mechanism. For example, in one embodiment, a set of fixed board stops (not shown for the sake of clarity) are provided at the far end of fastening position 116B. The fixed board stops may take the form of a vertical wall, one or more blocks, a set of pins, or other structure that provides a vertical surface against which the leading edge of board 104 impinges as a result of the motion of positioner 108. In other embodiments, a set of at least one actuated board stop is provided, as discussed in greater detail below.

In some implementations, the motion 112 of positioner 108 is controlled in response to board 104 impinging on the board stops. In one such example, actuator 110 is controlled using a torque control to maintain pressure between board 104 and the board stops within a defined range. Thus, board 104 may be held firmly in place for fastening regardless of the actual position of positioner 108. In a related example, a torque limit signal may be utilized to terminate the motion of positioner 108.

Fastening actuator 118 is actuated in response to fastener actuation signal 119. Fastening actuator 118 operates to attach board 104 to pallet assembly 130 (e.g., stringers). Pallet conveyor 132 advances pallet assembly 130 in direction 134 to reposition it for each fastening operation by actuator 118. Movement of pallet conveyor 132 is in response to conveyor control signal 133, which may be supplied in response to completion of a prior fastening actuation, in advance of a next fastening operation, or in response to a different action, such as positioning of board 104 into fastening position 116B.

Controller 120 includes circuitry that implements logic for coordinating the operation of actuators 106, 110, and 118. In some implementations, controller 120 may be a processor-based system, such as a programmable logic controller (PLC), a microcontroller configured by embedded firmware or software, a computing device such as a personal computer (PC) system configured by suitable software running over an operating system, or a special-purpose digital controller device, according to various examples. In related examples, controller 120 may be implemented using digital logic circuitry such as a field-programmable gate array (FPGA) or the like, which implements sequential logic. Controller 120 produces outputs 122, which in the illustrated example include signals 107, 111, 119, and 133. In addition, controller 120 may include sensor input 124 that receives information from one or more sensors 126 arranged to monitor the state and operational conditions of BPS 100 and boards 104.

According to some embodiments, sensor 126 is a board monitor that produces an indication of the position or movement of each board 106 as it is released from hopper 102 and settles into queued position 116A. Examples of board monitoring sensor technology that may be employed include optical distance sensing, capacitive proximity sensing, ultrasonic distance sensing, video-capture-based sensing, vibration sensing, pressure or load sensing, radio-frequency (RF)-based distance sensing such as RADAR, or the like, without limitation.

In related embodiments, board 104 is aligned after its placement on positioner 108 by a system of actuated board guides. In one example, actuated board guides include retractable surfaces (e.g., walls, blocks, pins, or the like) that are generally positioned according to the width of board input hopper 102, and are actuated to deploy and retract as needed. In their deployed position, the actuated board guide surfaces guide or align each board 104 properly into queued position 116A after board 104 is advanced from input hopper 102. In their retracted position, the actuated board guides are out of the way so as to not interfere with the process of advancing board 104 into queued position 116A. The deployment and retraction of the actuated board guides is based on the state of the board-dropping procedure from hopper 102. An illustrative example of the actuated board guides is described in greater detail below with reference to FIGS. 6-7.

In some embodiments, controller 120 coordinates the operation of the various actuators in a way that effectively facilitates operational throughput. For instance, in examples where operations include release of individual boards 104 via gate mechanism 106, shuttling of positioner 108 between the retracted position and extended position 114, and actuation of fastening actuator 118, certain operations may be performed concurrently such that the advancement of boards 104 through BPS 100 is in a pipelined fashion. For instance, in one type of embodiment, board 104 may be dropped, placed, or otherwise advanced, into queued position 116A, while positioner 108 is in extended position 109, while positioner 108 is moving towards or away from extended position 109. Thus, in this type of embodiment, board 104 may be advanced from hopper 102 into queued position 116A.

After being advanced into queued position 116A, board 104 may be kept in place as positioner 108 is moved into its retracted position, thereby dropping from the top surface of positioner 108 onto the top surface of slide plate 109 (and thus in front of positioner 108—i.e., to the left of positioner 108 as depicted in FIG. 1) while still in queued position 116A. During the ensuing forward motion of positioner 108, positioner 108 pushes board 104 forward (i.e., to the left in FIG. 1) into fastening position 116B.

Figure 2:
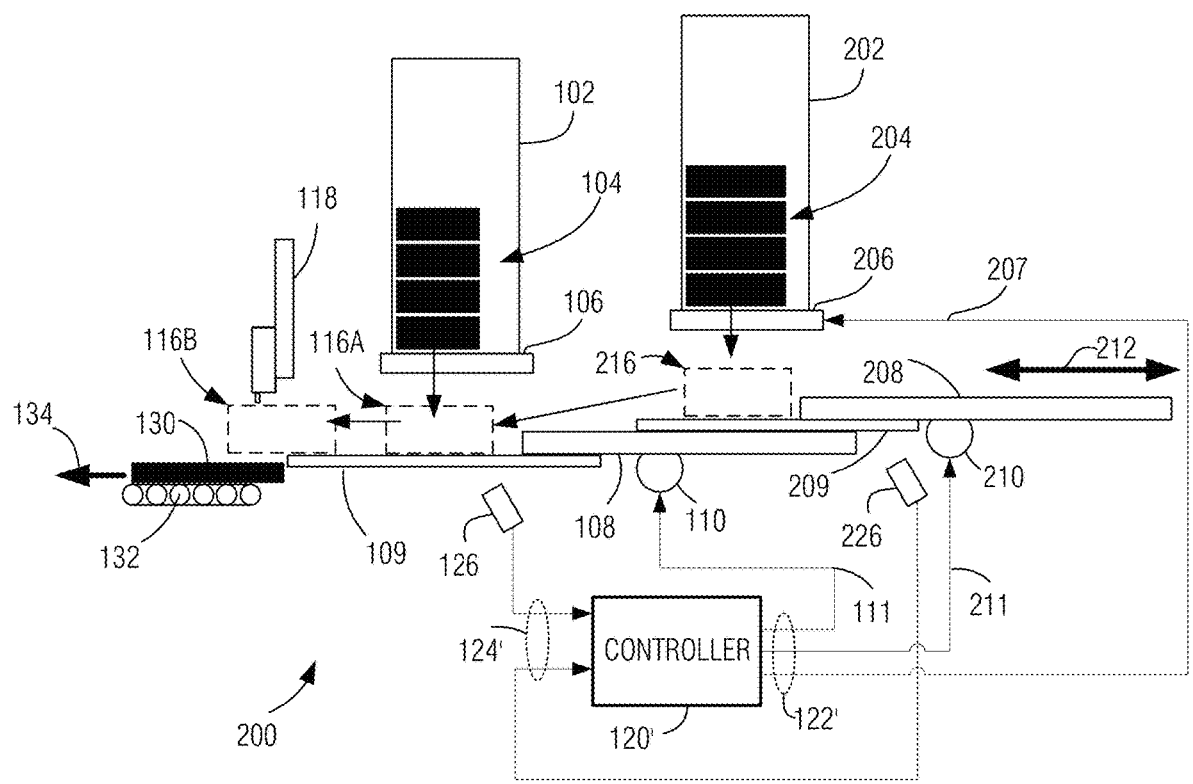
FIG. 2 is a schematic diagram illustrating another example of a BPS according to a related type of embodiment.

FIG. 2 is a schematic diagram illustrating a BPS 200 according to a related type of embodiment. BPS 200 has many of the features of BPS 100 described above with reference to FIG. 1, and adds some additional features. For the sake of clarity, some of the features described with reference to FIG. 1 are not shown in FIG. 2, although it should be noted that such features are not necessarily omitted from an implementation of BPS 200.

BPS 200 includes a secondary hopper 202 that holds boards 204. Boards 204, as depicted, may be differently sized than boards 104 in hopper 102. Boards 204 may also be similarly sized to boards 104 in hopper 102. In some implementations, as described in greater detail below, hoppers 102 and 202 each include adjustable guides for accommodating variously-sized boards. Boards 204 in secondary hopper 202 are released via gate mechanism 206, which is similar in construction and operation to gate mechanism 106. Gate mechanism 206 is responsive to actuation signal 207 to drop, place, or otherwise advance an individual board 204 into secondary pre-queued position 216.

Secondary positioner 208 is movable by actuator 210 in response to secondary motion control signal 211. Movement may be reciprocating as depicted at 212 between an extended position and a retracted position. Movement 212 which is towards the extended position advances board 204 to queued position 116A as shown, from which position the positioner 108 may advance board 204 to fastening position 116B. Notably, boards 104 and 204 may be placed in queued position 116A from various different sources and, in some implementations, from various initial positions.

In some implementations, secondary positioner 208 may be arranged and controlled to facilitate the positioning or movement of boards 104, 204 that are carried by positioner 108. For instance, in one example, secondary positioner 208 may be used to maintain a position of a board 104, 204 in queued position 116A while positioner 108 is retracting and creating an interfacial shearing effect between board 104, 204 and the top surface of positioner 108.

In one implementation, secondary pre-queued position 216 is on the top surface of slide plate 209 in front (i.e., to the left in FIG. 2) of secondary positioner 208. In another implementation, secondary pre-queued position 216 is on the top surface of secondary positioner 208 when secondary positioner 208 is not in its retracted position, and may drop onto the top surface of slide plate 209 (still at secondary pre-queued position 216) when secondary positioner 208 retracts.

In another type of implementation, slide plate 209 is omitted. In one such example, board 204 is advanced from hopper 202 onto the top surface of positioner 108 at secondary pre-queued position 216 (e.g., while positioner 108 is in its extended position or while positioner 108 is being retracted) and while secondary positioner 108 is in its retracted position. In this example, board 204 may be prevented from moving backwards while on the top surface of positioner 108 by impinging on the front edge of secondary positioner 208 while secondary positioner 208 is in its retracted position, as depicted in FIG. 2. In another example where slide plate 209 is omitted, secondary pre-queued position 216 is on the top surface of secondary positioner 208 when secondary positioner 208 is not in its retracted position, and may drop onto the top surface of positioner 108 (still at secondary pre-queued position 216) when secondary positioner 208 retracts.

Controller 120' operates similarly to controller 120 described above with reference to FIG. 1, except that controller 120' additionally controls gate mechanism 206, secondary positioner 208 via signals 207 and 211, which are part of outputs 122' (some output signals not being shown for clarity). Inputs 124' include sensor signals from sensor 126 monitoring queued position 116A and sensor 226 monitoring secondary pre-queued position 216.

In related implementations (not shown), there may be additional secondary hoppers and corresponding gate mechanisms, positioners, sensors, and actuators, with sensing and control signaling suitably interfaced with the controller.

Figure 3:
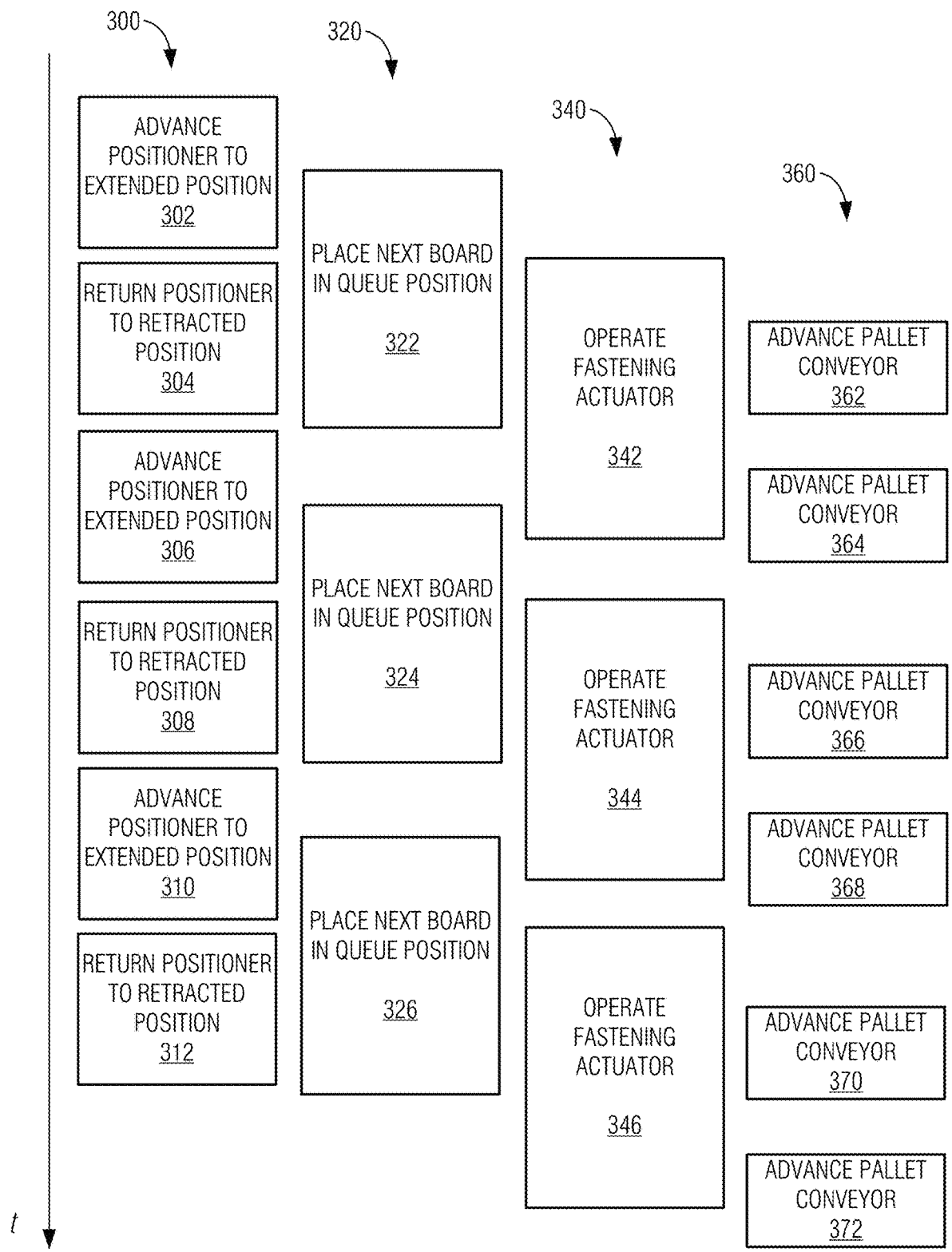
FIG. 3 is a timing diagram illustrating an example of some of the coordinated operations of the various actuators of a BPS of FIG. 1 or FIG. 2.

FIG. 3 is a timing diagram illustrating an example of some of the coordinated operations of the various actuators of BPS 100 or BPS 200. As depicted along timeline t, positioning operations 300 of positioner 108 occur contemporaneously with certain operations 320 to place boards in queue position 116A, operations 340 of fastening actuator 118, and operations 360 to advance the pallet conveyor 132. The sequence of operations as shown assumes an initial condition of a board 104, 204 placed at queued position 116A and pallet assembly 130 positioned by pallet conveyor 132 in alignment to receive that board 104, 204. At 302, positioner 108 advances to its extended position 114 to move board 104, 204 to fastening position 116B. While positioner 108 is in motion to its extended position 114, at 322 the next board 104, 204 is placed in queue position 116A. Placement of the next board in queue position 116A may be in response to a sensor input verifying that the board 104, 204 which was most recently moved from queue position 116A has in fact cleared queue position 116A to make room for the next board 104, 204. Sensor 126 or a different sensor (not shown) may be used to verify clearance of the prior board from queue position 116A.

The source of the next board 104, 204 may be hopper 102 or secondary hopper 202. Placement of the next board 104, 204 may be as simple as dropping board 104 into place via actuation of gate mechanism 106, or a more complex series of operations, such as positioning of a board 104, 204 via secondary positioner 208, for instance.

In related embodiments, advancement of a board 104, 204 in queue position 116A may involve the use of sensor 126, sensor 226, or some combination thereof, to assess a state of board 104, 204 that is indicative of readiness of the board to be handled by positioner 108. The state of the board to be assessed may include bouncing, flexing, or other vibration of the board, with the readiness being defined as a degree of vibration below a certain threshold or having a certain damping characteristic, for instance. By way of example, when a certain board 104, 204 is vibrating at a level beyond a state that is considered "settled" according to the applied settling criteria, motion of the positioner 108 is postponed until the settling criteria is met. The interpretation of the sensor signals and application of the settling criteria may be performed by controller 120, 120'. In a related example, the state of the board may likewise be assessed at secondary pre-queued position 216 using sensor 226 before positioning of the board via secondary positioner 208 is permitted.

Figure 4:
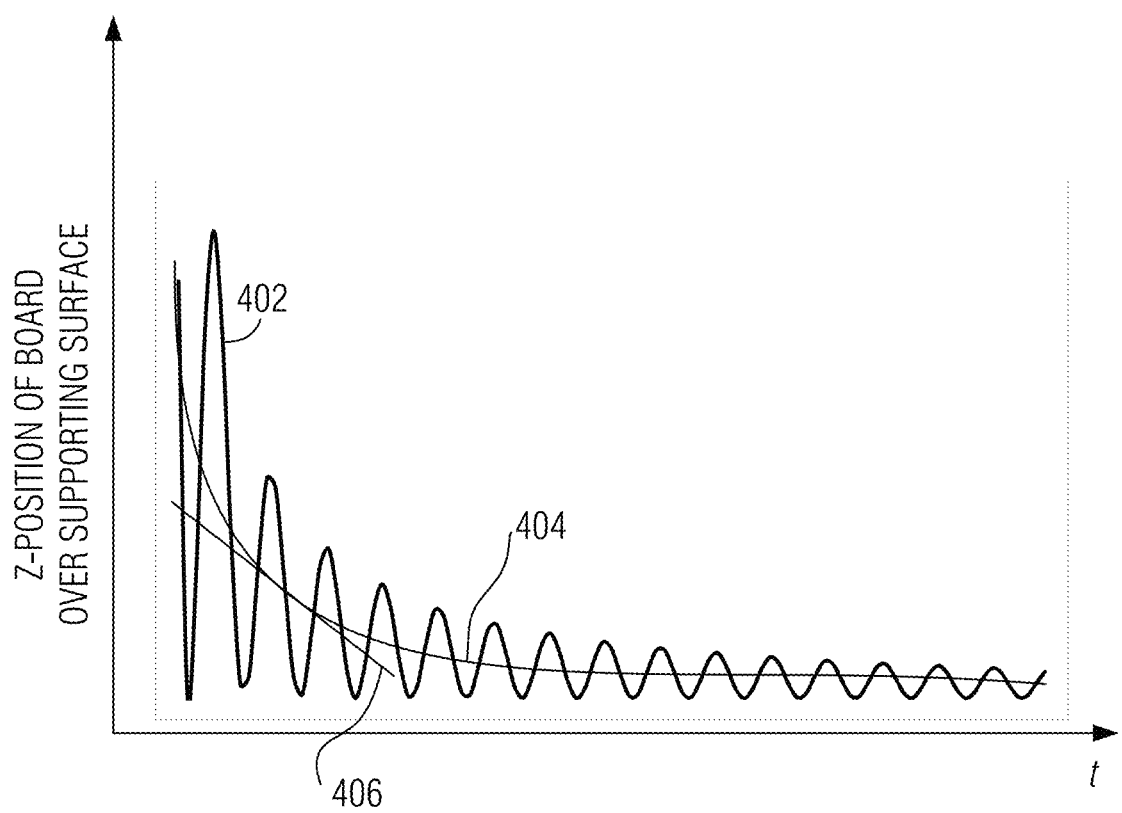
FIG. 4 is a graph illustrating an example of the sensed vibration of a board along with an example of settling criteria as applied by a controller of a BPS according to some embodiments.

FIG. 4 is a graph illustrating an example of the sensed vibration of a board 104, 204, along with an example of settling criteria as applied by controller 120, 120'. In the graph, waveform 402 represents the sensed and sampled vertical (Z-axis) position of a board released from the hopper relative to the supporting surface onto which the board was released, as a function of time. The supporting surface may be positioner 108 in some examples. As shown, waveform 402 has the general shape of a damped oscillation. The amount of vibration damping, or settling rate, can vary board-to-board depending on the characteristics of the wood, or material composition of the board, such as moisture content, hardness, dimensions, etc. Environmental conditions may also affect the vibration-damping characteristics.

Figure 5:
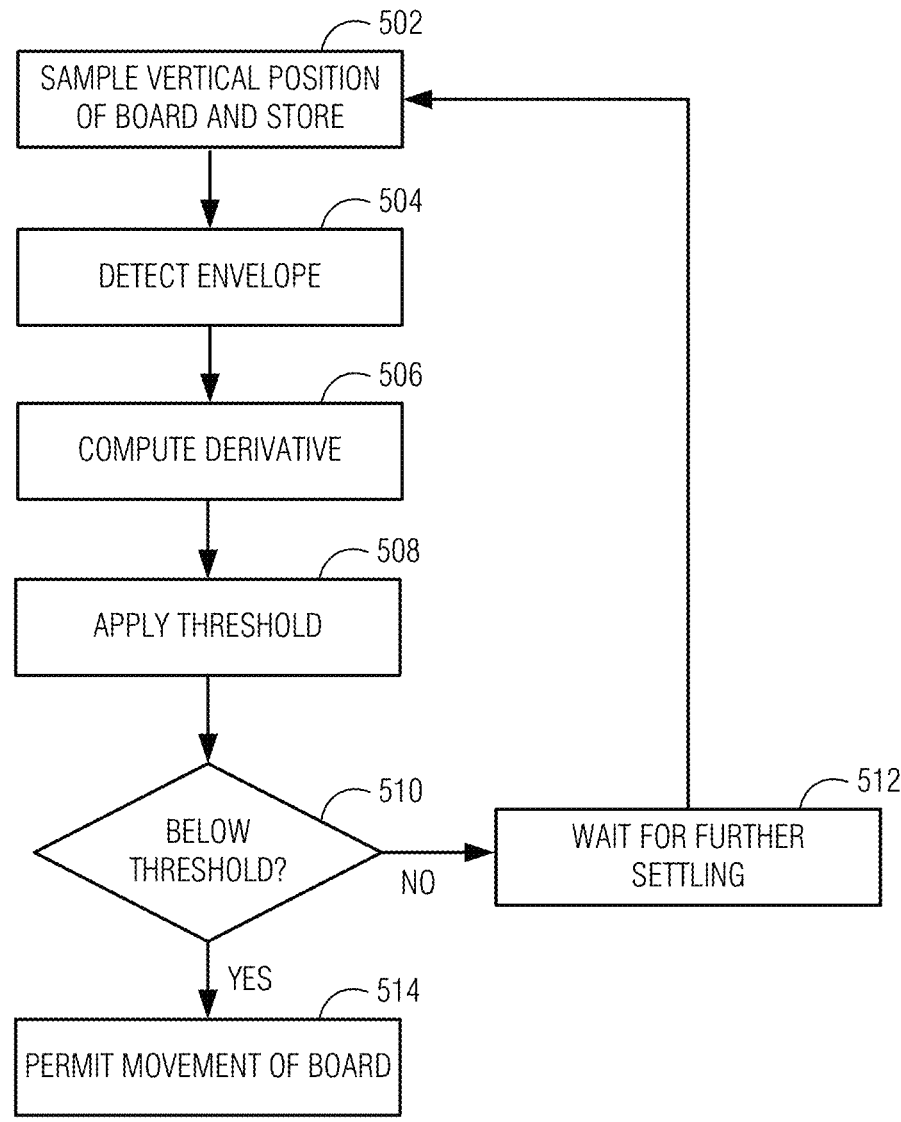
FIG. 5 is a flow diagram illustrating a process that may be carried out by a controller to implement vibration sensing and apply movement criteria based thereupon, according to some embodiments.

FIG. 5 is a flow diagram illustrating a process that may be carried out by controller 120, 120' according to an example. At 502, the vertical position of the board is sampled and stored as a data structure such as a vector or tuple, containing a time series representing the sensed vibration waveform 402. Successive samples may be appended to the data structure as more samples are collected. At 504, the time-series waveform is processed to detect an envelope, or general shape, of the sensed vibration waveform 402. Any suitable envelope-detection technique may be used, such as low-pass filtering, peak-and-hold detection, or the like. As shown in the example illustrated in FIG. 4, an averaging function may be applied to produce envelope curve 404. At 506, the vibration waveform 402 is processed at the present point to produce an indication of its slope (i.e., derivative). At 508, a predefined slope threshold 406 is compared against the slope to produce a threshold-comparison result. At decision 510, if the magnitude of the current slope of envelope curve 404 is not below threshold 406, meaning that the envelope curve is steeper than the threshold, the process loops to 512 to delay moving the board 104, 204 via positioner 108 in order to allow the board to settle further before being advanced through BPS 100, 200. On the other hand, if the slope of the vibration waveform at the present point is below the threshold, meaning that the board has settled to a degree that it can be positioned and fastened reliably, the process advances to 514 to permit movement of the board.

Notably, the settling determination technique illustrated in FIGS. 4-5 as criteria for positioning each board does not require for the board to have completely settled (e.g., to a point where vibration is not detectable). Rather, threshold 406 can be set to a level at which the vibration is permitted so long as it does not adversely affect operational reliability (i.e., uptime) and performance (i.e. throughput) of BPS 100, 200. This approach allows the throughput to be maximized dynamically as the characteristics of each board or operational conditions affecting the vibration dampening of the board may vary.

Figure 6:
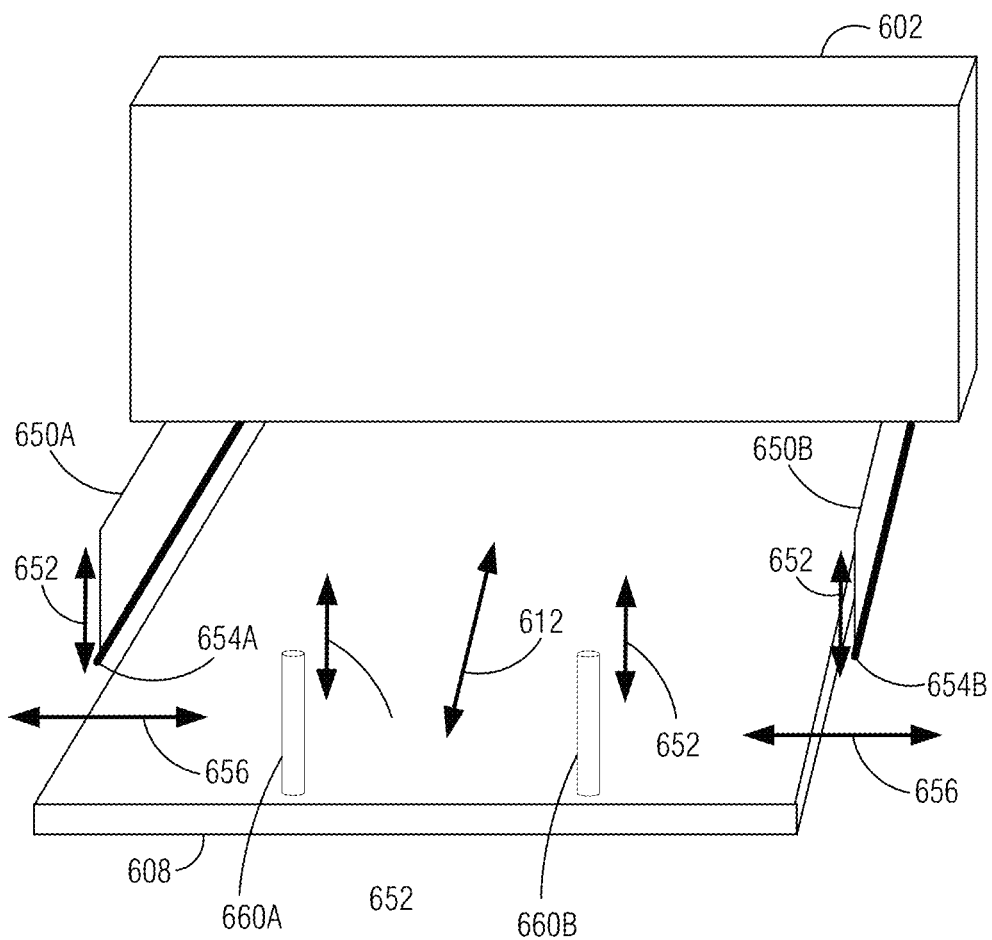
FIG. 6 is a simplified schematic diagram illustrating actuated board guides and actuated board stops in accordance with some embodiments.

In embodiments employing the actuated board guides described above, their actuation may be dependent on the dropping procedure of the boards. FIG. 6 is a simplified schematic diagram illustrating actuated board guides in accordance with some such embodiments. As depicted, input hopper 602, which in this example represents input hopper 102 (FIGS. 1, 2) or input hopper 202 (FIG. 2), is situated above positioner 608, which represents positioner 108 (FIG. 1, 2) or 208 (FIG. 2). Positioner 608 reciprocates along the forward and backward directions as indicated at 612. Actuated board guides 650A and 650B are each located on a respective side of positioner 608.

In some examples, actuated board guides 650A and 650B are movable along the upward and downward directions 652. As shown in FIG. 6, actuated board guides 650A and 650B are in the deployed position. When retracted, actuated board guides 650A and 650B descend beneath the elevation of the top surface of positioner 608. In the schematic diagram of FIG. 6, actuated board guides 650A and 650B each descends into a respective slot 654A, 654B. Slots 654A and 654B are shown in this example to illustrate the relative positioning and movement range of actuated board guides 650A and 650B. It should be noted that in various practical embodiments, actuated board guides 650A and 650B may or may not descend into slots.

Actuated board guides 650A and 650B may be actuated by a motor and rack-and-pinion linkage to provide linear movement. In other embodiments, actuated board guides 650A and 650B may be actuated using pneumatic pistons or other actuators.

In other examples, actuated board guides 650A and 650B may move along horizontal directions 656 such that in the deployed position actuated board guides 650A and 650B are closer together at approximately the length of the board (aligned along the horizontal directions 656) and in the retracted position actuated board guides 650A and 650B are farther apart along horizontal directions 656. In further embodiments, actuated board guides 650A and 650B may be actuated pivotally, such as by rotation about an axis aligned with forward and backward directions 612.

In a related embodiment, the nominal horizontal positions of actuated board guides 650A and 650B are further adjustable along horizontal directions 656 to accommodate boards of different lengths.

Figure 7:
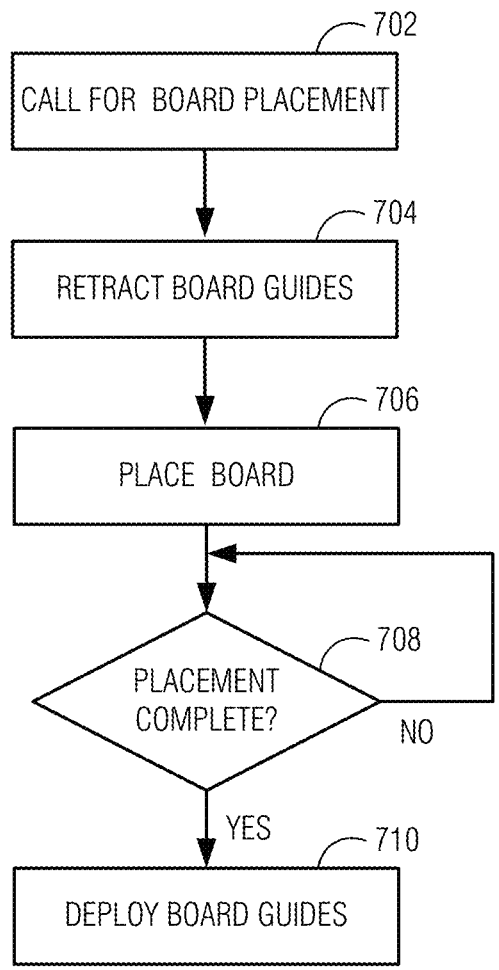
FIG. 7 is a flow diagram illustrating operation of actuated board guides such as those of FIG. 6 according to an example.

FIG. 7 is a flow diagram illustrating operation of actuated board guides 650A and 650B according to an example. The control of the process may be carried out by a controller such as controller 120, 120'. At 702, the controller receives a call for placement of a board onto positioner 608. In response to this call, at 704, actuated board guides 650A and 650B are retracted. Thereafter, at 706, the board is placed onto positioner 608. Placement of the board may be as simple as dropping the board from hopper 602. At 708, a determination is made as to whether the placement of the board is complete. For instance, the process described above in connection with FIGS. 4-5 may be carried out to determine when the board is sufficiently settled. If the placement is not complete, the process loops back until completion of the board placement is determined. Once placement is complete, actuated board guides 650A and 650B are deployed.

FIG. 6 further illustrates actuated board stops 660A and 660B. As depicted, actuated board stops 660A and 660B are pins that are movable along upward and downward directions 652. In other embodiments, actuated board stops 660A and 660B may have other structures, such as one or more blocks, one or more walls, etc. In their deployed position, as shown in FIG. 6, actuated board stops 660A and 660B are in their lowered position. In this deployed position, actuated board stops 660A and 660B are in the path of the board (which not shown in FIG. 6 for the sake of clarity) and are aligned with the desired final position of the leading edge of the board for fastening of the board. In their retracted position, actuated board stops 660A and 660B are in their raised position to not interfere with forward motion of the board in order to allow the board, once fastened, to be advanced in the forward direction.

Figure 8:
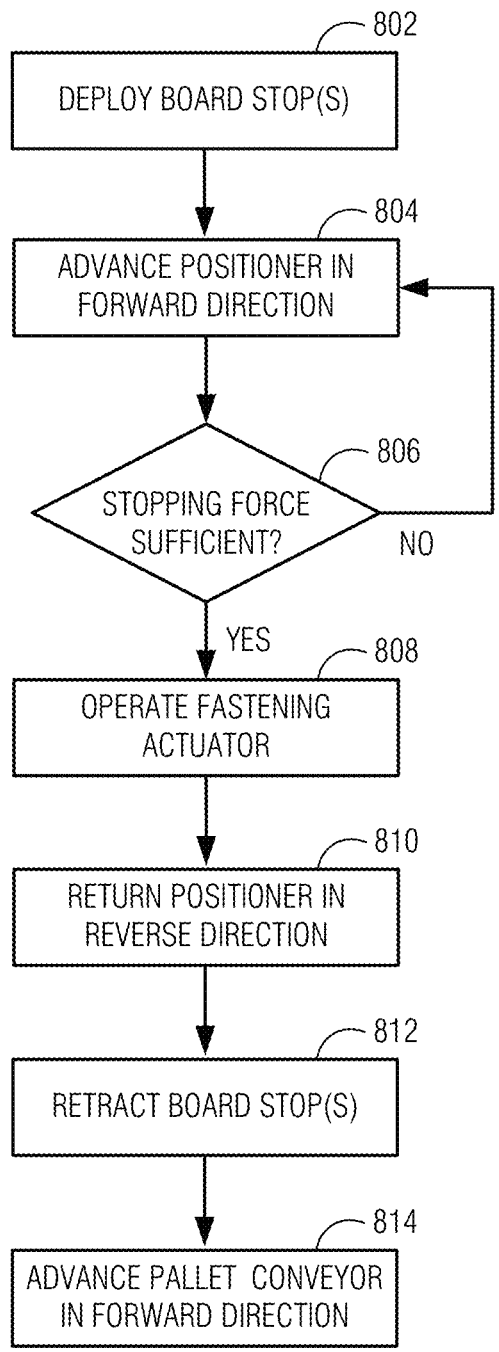
FIG. 8 is a flow diagram illustrating operation of actuated board stops such as those of FIG. 6 according to an example.

FIG. 8 is a flow diagram illustrating operation of actuated board stops 660A and 660B according to an example. The control of the process may be carried out by a controller such as controller 120, 120'. At 802, actuated board stops 660A and 660B are deployed. At 804, positioner 608 is advanced along the forward direction. Eventually, the leading edge of the board will impinge on deployed board stops 660A and 660B. At 806, a determination is made whether sufficient stopping force between the board and board stops 660A and 660B is established. This determination may be made based on a measurement of the motor torque (i.e., drive current) in the actuating motor of positioner 608. In the negative case, meaning the stopping force is insufficient, positioner 608 is further advanced. Once sufficient stopping force is established, the fastening actuator is operated at 808. At 810, positioner 608 is returned to along the reverse direction. Board stops 660A and 660B are retracted at 812. At 814, the pallet conveyor is advanced in the forward direction without interference between retracted board stops 660A and 660B and the board now fastened to the pallet.

Referring again to FIG. 3, in response to placement of positioner 108 in its extended position, at 342, the fastening actuator is operated. For instance, in implementations where the fastening actuator is a nail driver, operation may involve lowering a nail chuck to engage the nail driver with board 104, 204, feeding a nail into a nailing chamber, driving the chambered nail with an actuated drive pin, and raising the nail chuck. There may be multiple nail-driving cycles represented by operation 342, with the pallet assembly advanced from a first position to a second position for each nailing instance. This example is reflected by operations 362 and 364, in which the pallet conveyor 132 is advanced. In this example, the fastening actuation operation at 342 effects the fastening of board 104, 204 present at the initial condition, i.e., at queued position 116A.

Figure 9:
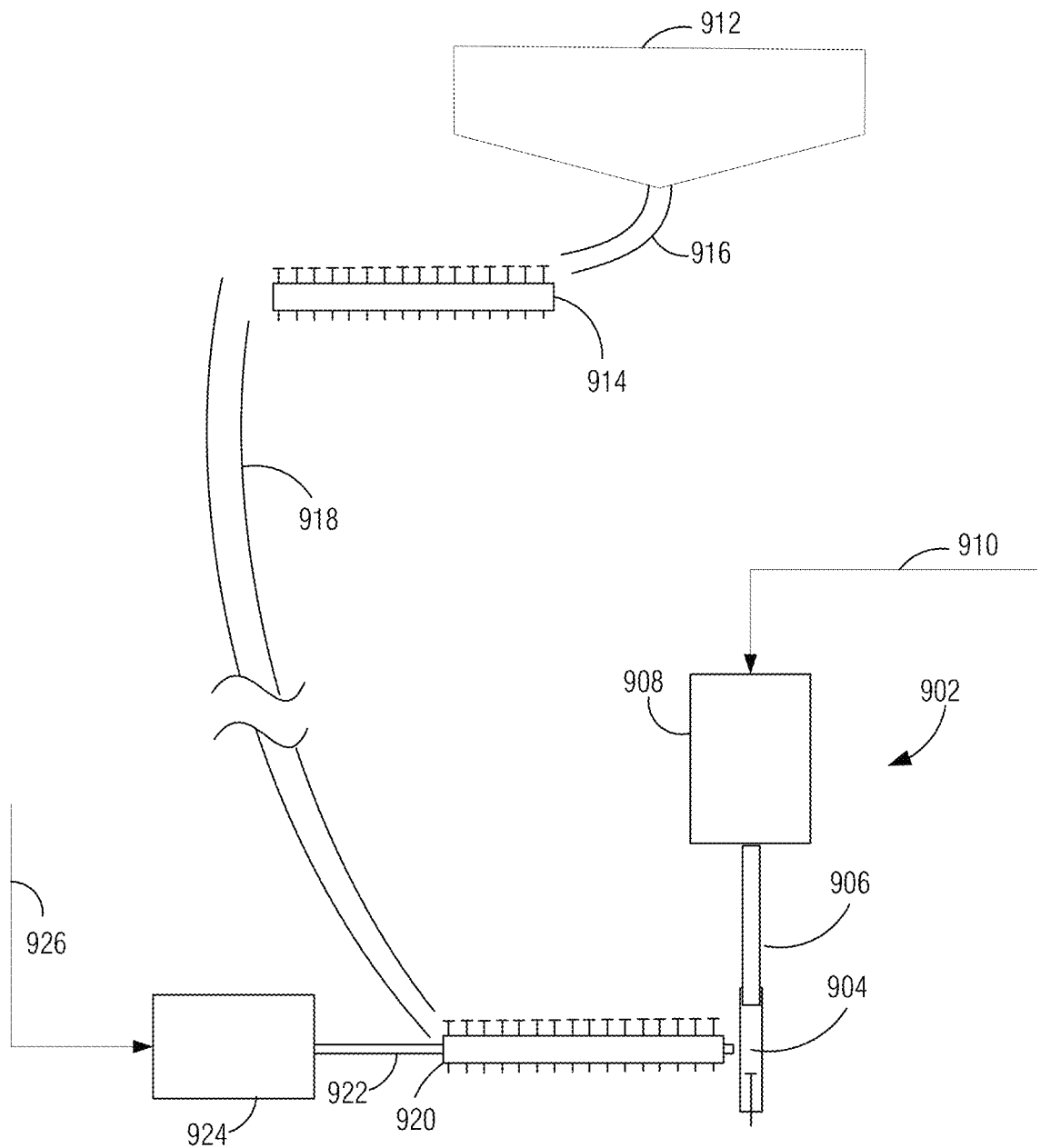
FIG. 9 is a simplified schematic diagram of a nail driver and nail delivery system according to some embodiments.

FIG. 9 is a simplified schematic diagram of a nail driver and nail delivery system according to some embodiments. As depicted, nail driver 902 includes a nailing chamber 904, drive pin 906, and nail-drive actuator 908. Nail-drive actuator 908 may be a pneumatic piston or other suitable fast linear actuator capable of advancing and retracting drive pin 906 with sufficient force to drive nails into boards and pallets. Nail-drive actuation signal 910, which may be originated by a controller such as controller 120, 120', activates nail-drive actuator 908.

Nails are fed into nailing chamber 904 from nail reservoir 912. Notably, in some embodiments, a dual-queue system is provided. Accordingly, nails from nail bowl 912 are initially accumulated in first queue 914 that is situated near nail reservoir 912. First queue may include a track from which nails may be reliably advanced. Nails may travel from nail bowl 912 to first queue 914 via channel 916, which may be a tube. Nails are advanced from first queue 914 by a feeder actuator (not shown) into second queue 920, which is located near nailing chamber 904.

Second queue 920 may be similar in principle to first queue 914, though in some implementations second queue 920 may be optimized for faster nail advancement. Nails travel from first queue 914 to second queue 920 via channel 918. Nails are advanced from second queue 920 into nailing chamber 904 by nail picker 922, which is operated by picker actuator 924. Picker actuator 924 may be controlled by pick signal 926, which may be provided by controller 120, 120'. Notably, pick signal 926 is distinct from nail-drive actuation signal 910. Accordingly, in some embodiments, nail picking for placement into nailing chamber 904 may be initiated at a time which is adjustable relative to the nail-driving cycle of drive pin 906. Advantageously, in some embodiments, nail picker 922 may be activated to start advancement of a nail into nailing chamber 904 while a prior nail is still being driven. In the time it takes for the advancing nail being picked to move towards nailing chamber 904, the prior nail will have been driven and drive pin 906 will have been retracted to vacate nailing chamber 904 into a ready state to receive the next incoming picked nail. Accordingly, the time during which nailing chamber 904 is vacant and idle may be reduced with proper timing adjustment of nail-drive actuation signal 910 and pick signal 926, thus increasing nailing throughput of nail driver 902.

In a related embodiment, first queue 914 and channel 916 may be omitted, such that queue 920 is fed directly from nail reservoir 912.

In response to completion of the movement of positioner 108 to its extended position 114 at 302, and during placement of the next board into queue position 116A at 322, operation of fastening actuator 118 at 342, and advancement of the pallet conveyor 132 at operation 362, positioner 108 is returned to its retracted position at operation 304. It should be noted that positioner 108 may be in motion during placement of the next board at 322, which may be placing next board 104, 204 onto positioner 108. In some implementations, the next board 104, 204 being placed is permitted to slide along a top surface of positioner 108, until it drops onto the top surface of slide plate 109 or, in other embodiments, at a proper site on positioner 108. While sliding, the next board 104, 204 may be held generally stationary (disregarding any dampening vibration movement along the z-axis) while positioner 108 is retracted.

In positioner operations 300 and 320, the motion of positioners 108 and 208 may be controlled to limit their acceleration and deceleration in various operational scenarios. For instance, the acceleration or deceleration may be limited to prevent or reduce the amount of sliding of board 104, 204 that is being advanced through BPS 100, 200. Thus, in some implementations, one board 104, 204 may be permitted to slide relative to positioner 108 while positioner 108 is specifically controlled to prevent a separate board 104, 204 from sliding on positioner 108.

In response to placement the next board 104, 204 in queue position 116A at 322, positioner 108 is advanced to its extended position at operation 306 to move this next board to fastening position 116B. Operation 322 may include a vibration sensing and board-movement authorization process such as the examples described above and illustrated with reference to FIGS. 4-5. Operation 306 to move positioner 108 may take place concurrently with operation of fastening actuator 118 at 342 and conveyance of pallet assembly 130 by pallet conveyor 132 at 362 or 364.

Operation 324 to place the next board 104, 204 in queue position 116A may be initiated in response to verification that the prior board 104, 204 has vacated queue position 116A. Operation 324 may be carried out in similar fashion to operation 322, and may proceed while fastening actuator 118 is operated at 344. Operation of fastening actuator 118 at 344 may be carried out in similar fashion to operation 342. The fastening operation at 344 fastens the board 104, 204 that has been placed in queue position 116A at operation 322. Pallet assembly advancement via pallet conveyor 132 at operations 366 and 368 correspond to fastening actuator operation at 344 and, once completed, advance pallet assembly 130 to the next position for fastening of the board 104, 204 that has been placed in queue position 116A at operation 324.

In response to completion of the movement of positioner 108 to its extended position 114 at 306, and during placement of the next board into queue position 116A at 324, operation of fastening actuator 118 at 344, and advancement of the pallet conveyor 132 at operation 366, positioner 108 is returned to its retracted position at operation 308. Operation 308 may be carried out in similar fashion to operation 304 described above.

As depicted in FIG. 3, an additional cycle may be carried out in response to placement of the next board 104, 204 in queue position 116A at 324. Accordingly, positioner 108 is advanced to its extended position 114 at operation 310 to move this next board to fastening position 116B. Operation 310 to move positioner 108 may take place concurrently with operation of fastening actuator 118 at 344 and conveyance of pallet assembly 130 by pallet conveyor 132 at 366 or 368.

Operation 326 to place the next board 104, 204 in queue position 116A may be initiated in response to verification that the prior board 104, 204 has vacated queue position 116A. Operation 326 may be carried out in similar fashion to operations 322 and 324 described above, and may proceed while fastening actuator 118 is operated at 346. Operation of fastening actuator 118 at 346 may be carried out in similar fashion to operations 342 and 344. The fastening operation at 346 fastens the board 104, 204 that has been placed in queue position 116A at operation 324. Pallet assembly advancement via pallet conveyor 132 at operations 370 and 372 correspond to fastening actuator operation at 346 and, once completed, advance pallet assembly 130 to the next position for fastening of the board 104, 204 that has been placed in queue position 116A at operation 326.

In response to completion of the movement of positioner 108 to its extended position 114 at 310, and during placement of the next board into queue position 116A at 326, operation of fastening actuator 118 at 346, and advancement of the pallet conveyor 132 at operation 370, positioner 108 is returned to its retracted position at operation 312. Operation 312 may be carried out in similar fashion to operations 304 and 308 described above.

Figure 10A:
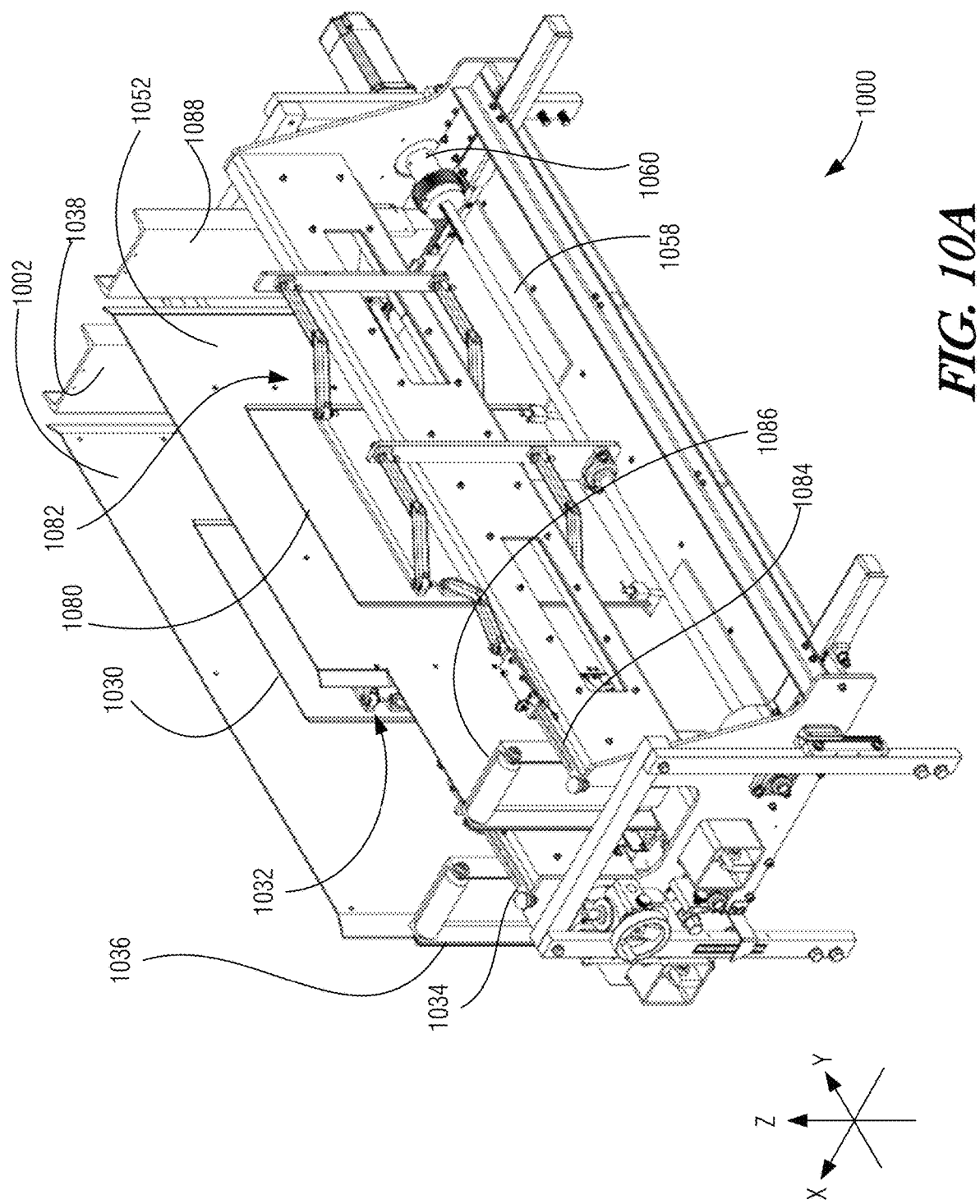
FIG. 10A is an isometric view diagram illustrating a major portion of a BPS according to an example embodiment.

FIG. 10A is an isometric view diagram illustrating a major portion of BPS 1000 according to an example embodiment. In this example, BPS 1000 may implement some of the features and operations discussed above with reference to FIGS. 1-5. As depicted, front hopper 1002 is an implementation of hopper 102, and rear hopper 1052 is an implementation of secondary hopper 202. Hopper 1002 and hopper 1052 are each adjustable to accommodate boards of different lengths and widths. As shown, hopper 1002 includes width-adjustment plate 1030, and length-adjustment ends 1036 and 1038. Likewise, hopper 1052 includes width-adjustment plate 1080, and length-adjustment ends 1086 and 1088. Width-adjustment plates 1030 and 1080 are adjustable along the X direction, which is the direction of forward travel of the boards through BPS 1000 in the course of its operation. Length-adjustment ends 1036, 3108 and 1086, 1088 are adjustable along the Y direction transversely to the direction of forward travel of the boards.

As can be partially seen in FIG. 10A, linkages 1032 and 1082 are respectively provided for each hopper 1002, 1052 to facilitate repositioning of width-adjustment plates 1030 and 1080. Linkages 1032 and 1082 are respectively coupled to width-adjustment sliders 1034 and 1084. Width-adjustment slider 1034 and 1084 travel along the Y direction to effect adjustment of the positions of width-adjustment plates 1030 and 1080, respectively.

Length-adjustment ends 1036, 3108 and 1086, 1088 may be pneumatically or hydraulically adjusted FIG. 10A also shows a portion of queue plate 1058, which is an implementation of secondary positioner 208. Queue plate 1058 is moved by actuator 1060, which is an implementation of actuator 210. Actuator 1060 includes a motor, such as a servo motor, and a rack-and-pinion arrangement as shown. A similar arrangement is provided in BPS 1000 to implement positioner 108 and actuator 110, though it is not visible in FIG. 10A.

Figure 10B:
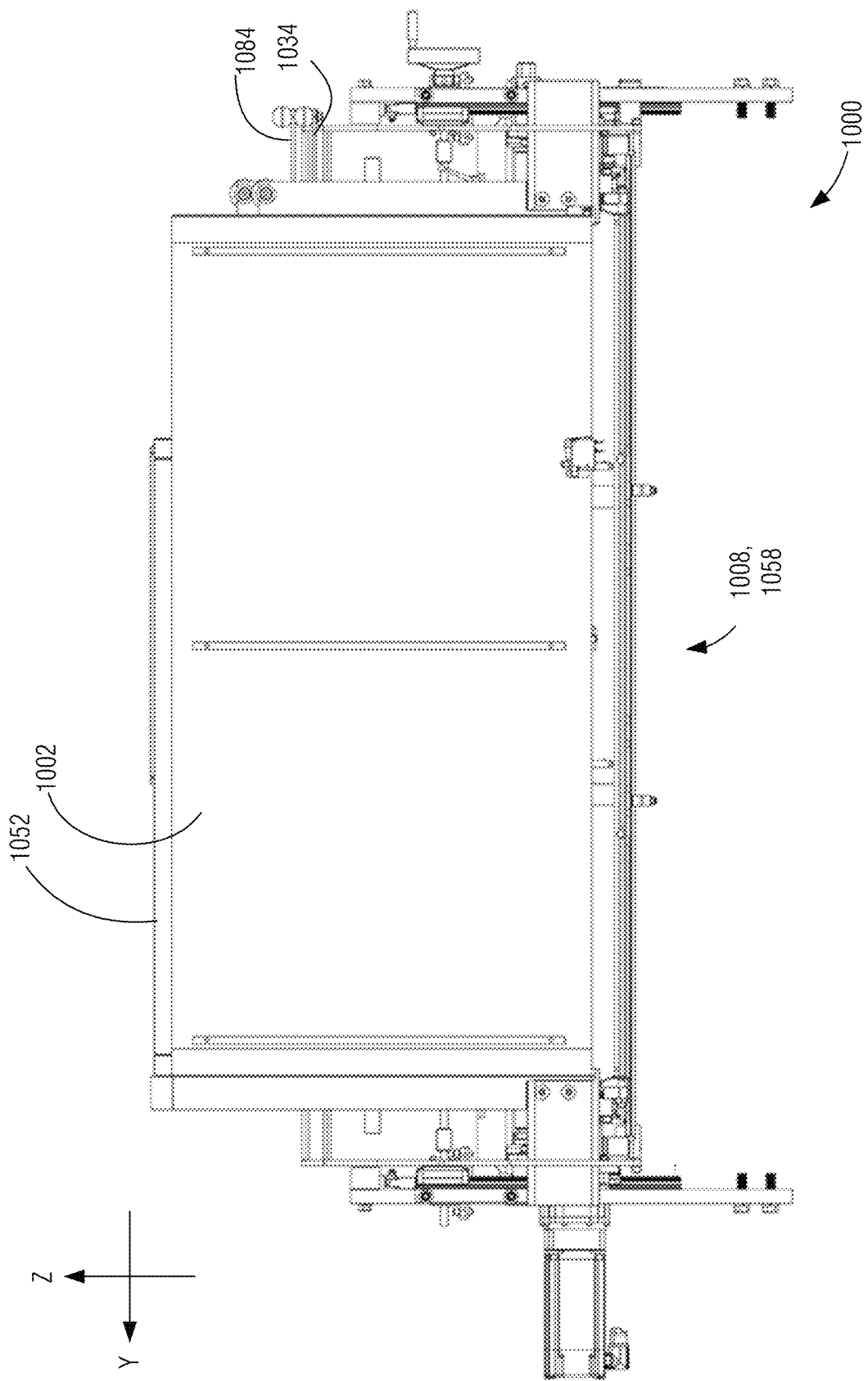
FIG. 10B is a front elevational view diagram of the BPS of FIG. 10A.
Figure 10C:
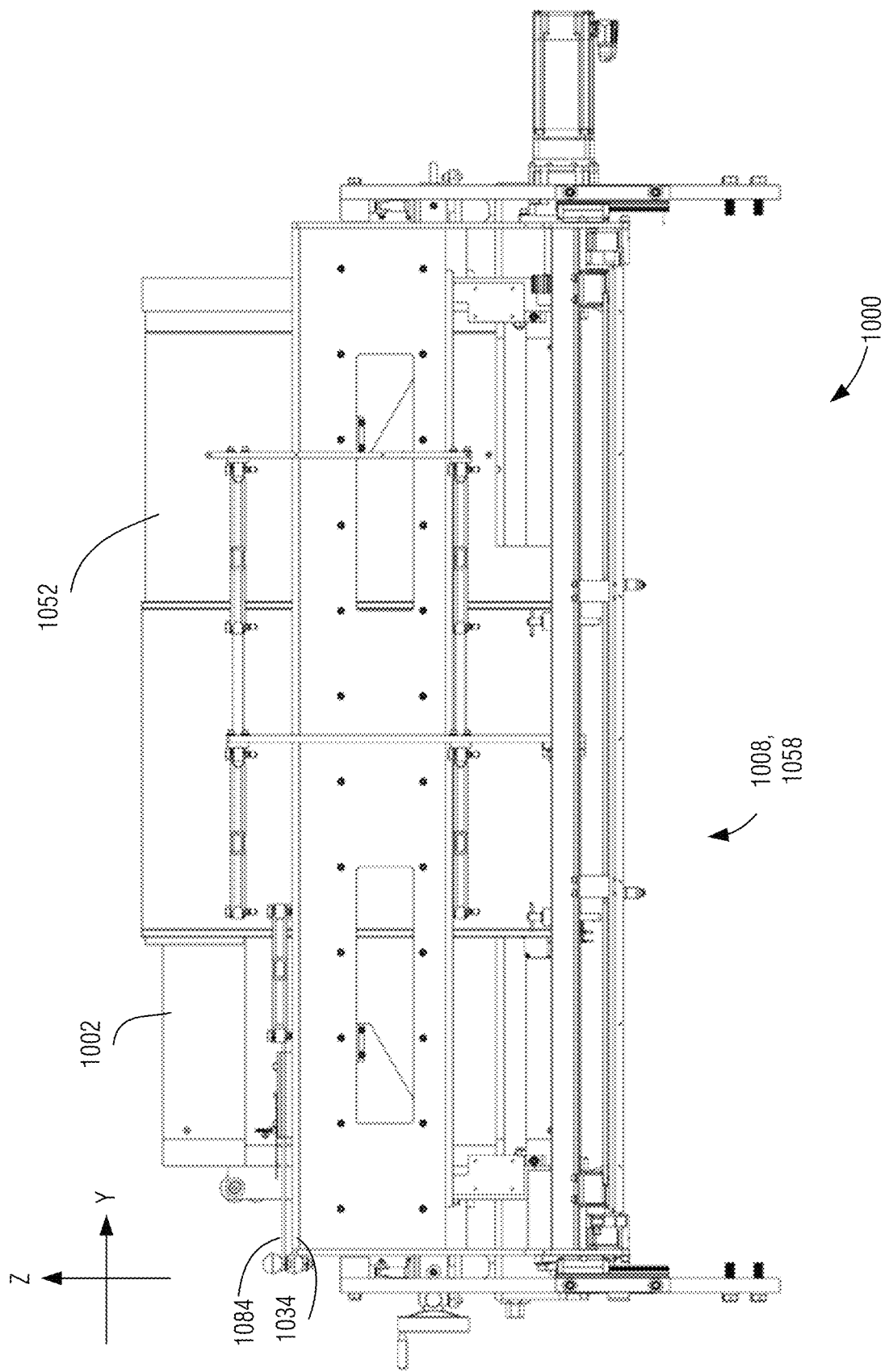
FIG. 10C is a rear elevational view diagram of the BPS of FIGS. 10A-10B.
Figure 10D:
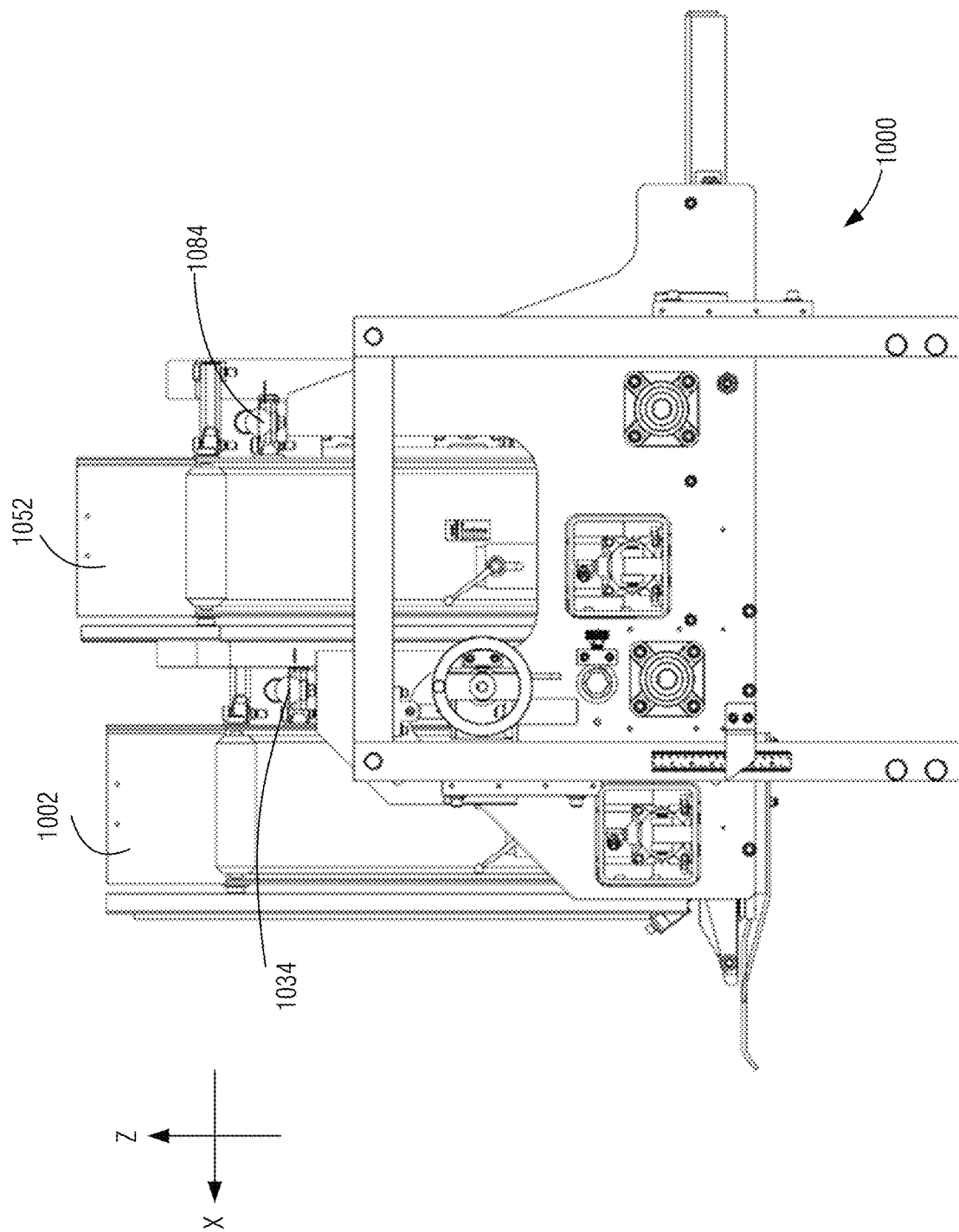
FIG. 10D is a side elevational view diagram of the BPS of FIGS. 10A-10C.

FIG. 10B is a front elevational view drawing of BPS 1000 (looking in the —X direction). FIG. 6C is a rear elevational view drawing of BPS 1000 (looking in the +X direction). Queue plate 1058 and, beneath it, shuttle plate 1008 are situated beneath hoppers 1052 and 1002. FIG. 10D is a side elevational view of BPS 1000. Queue plate 1008 is an implementation of positioner 108 discussed above with reference to FIGS. 1-3 and 6-8 according to the embodiment shown.

Figure 10E:
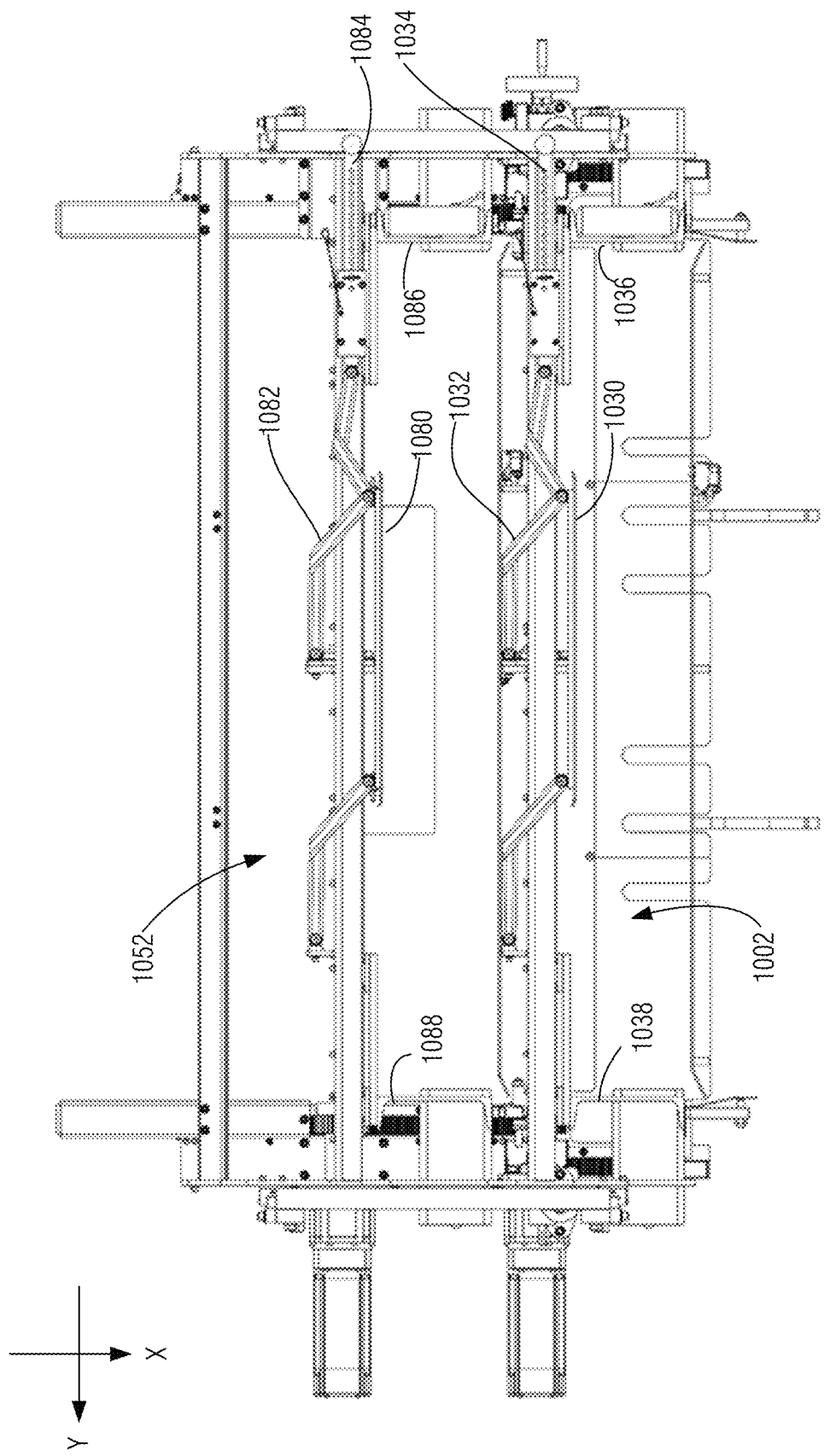
FIG. 10E is a plan view diagram of the BPS of FIGS. 10A-10D.

FIG. 10E is a plan view diagram showing BPS 1000 from the top. Linkages 1032 and 1082 are more clearly shown in this view. As shown, linkages 1032 and 1082 are parallelogram linkages that ensure parallel orientation of width-adjustment plates 1030 and 1080, respectively.

Figure 11A:
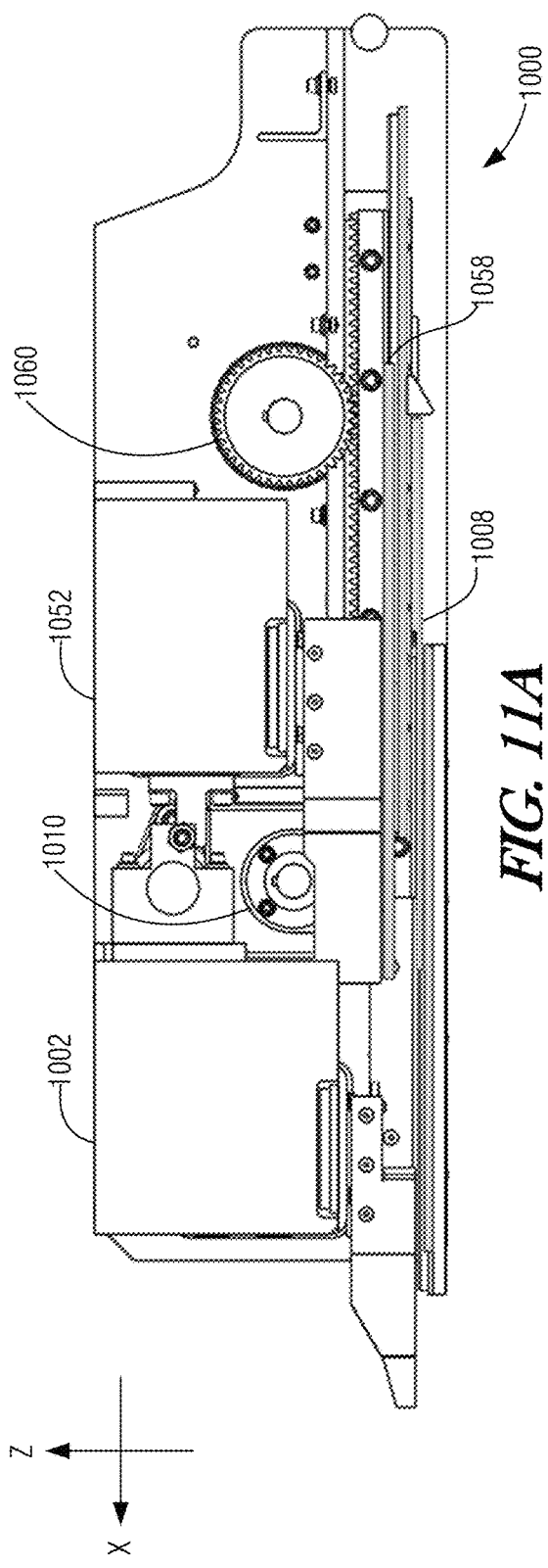
FIGS. 11A-11D are cutaway views of the BPS of FIGS. 10A-10E showing various stages of operation using a shuttle plate and a queue plate according to some embodiments.
Figure 11B:
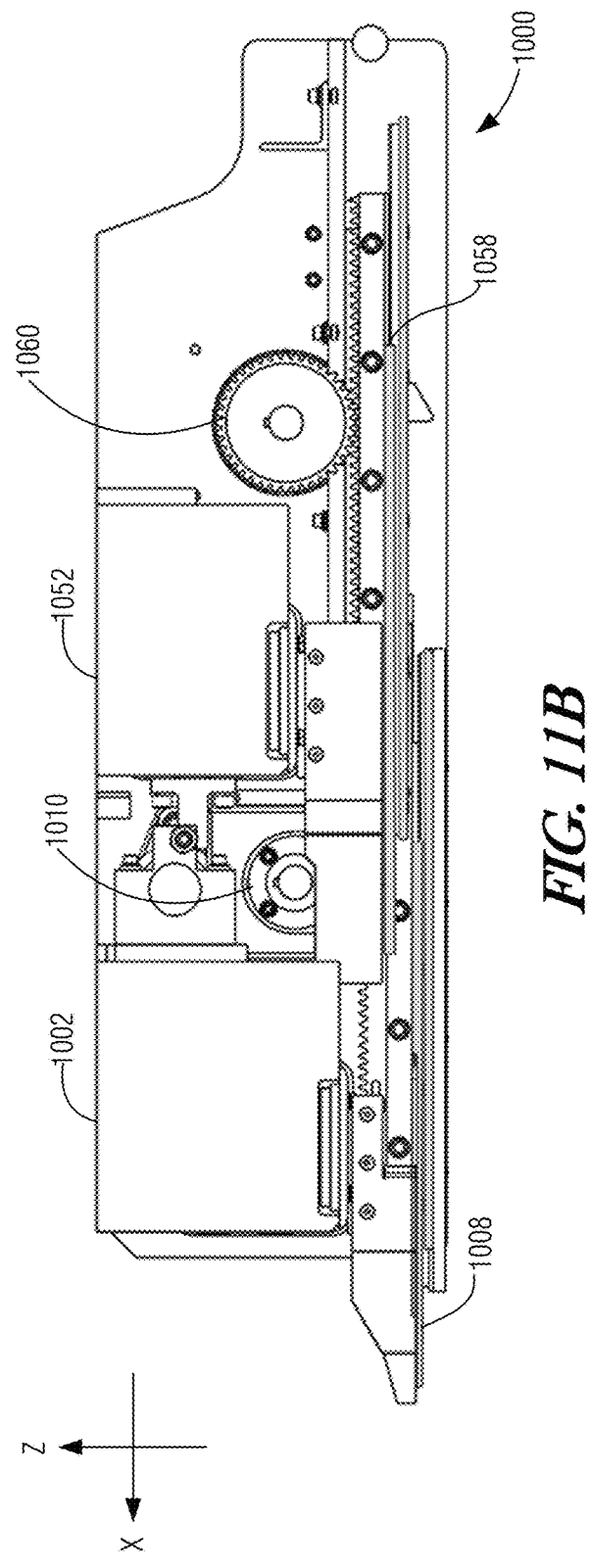

FIGS. 11A-11D are cutaway views of BPS 1000 showing various stages of operation using shuttle plate 1008 and queue plate 1058. In FIG. 11A, shuttle plate 1008 is in its retracted position. This position may be achieved in operations such as operations 304, 308, and 312 as discussed above with reference to FIG. 3. In FIG. 11B, shuttle plate 1008 is in its forward (extended) position. This position may be achieved in operations such as operations 302, 306, and 310.

Figure 11C:
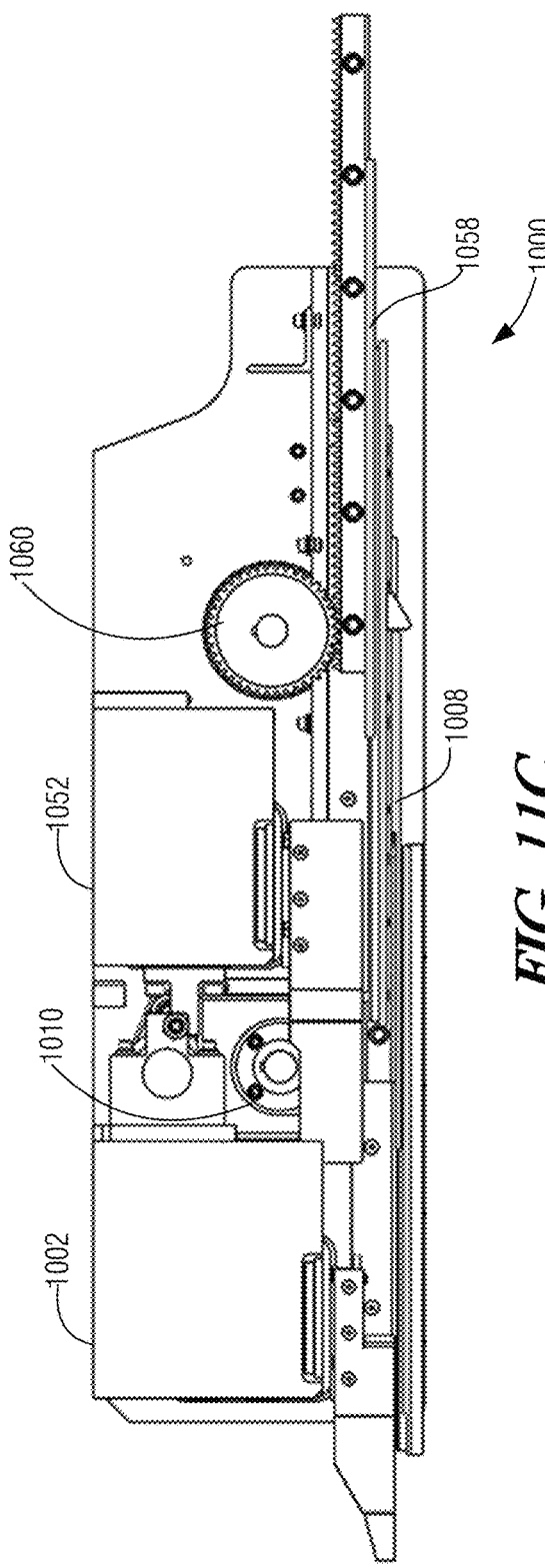
Figure 11D:
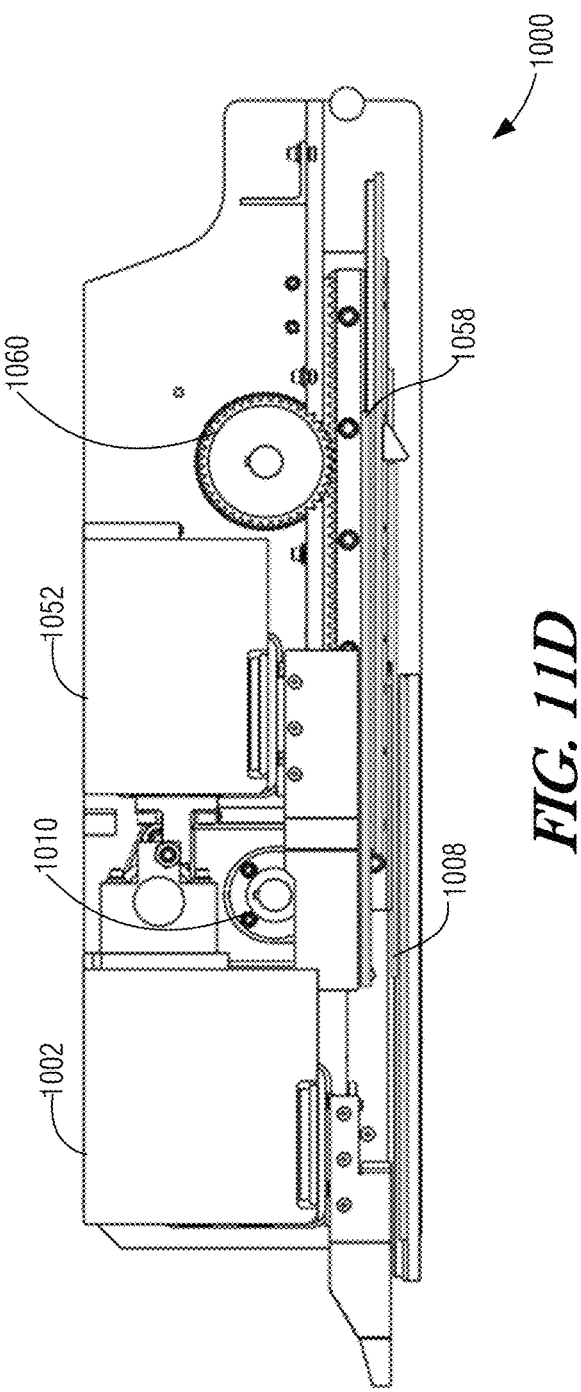

In FIG. 11C, queue plate 1058 is in its retracted position. In FIG. 11D, queue plate 1058 is in its forward position. In some implementations, queue plate 1058 may be used in its forward position to retain the position of a dropped board while shuttle plate 1008 is retracted. The operation of queue plate 1058 may be coordinated with operation of hopper 1052 as described above in connection with operations 322, 324, and 326 with reference to secondary hopper 202.

ADDITIONAL EXAMPLES

Example 1 is a board positioning system (BPS) for use with a pallet assembly system, comprising: a first hopper for holding boards to be fastened to a pallet under assembly; and a first positioner movable under the first hopper between a retracted position and an extended position, the first positioner arranged to move a subject board from a queue position to a fastening position, wherein the fastening position is aligned with a fastening actuator operable to fasten the subject board to the pallet under assembly; wherein the first hopper is operative to advance the subject board at the queue position while the first positioner is in motion between the queue position and the fastening position and before the first positioner movably engages with the subject board; wherein the queue position is on a surface of the first positioner; and wherein the first positioner, when at the queue position, is operative to movably engage with the subject board and to initiate movement of the subject board to the fastening position.

In Example 2, the subject matter of Example 1 includes, wherein the first hopper includes a gate mechanism arranged to advance the subject board at the queue position such that the subject board slides along a top surface of the first positioner while the first positioner is in motion and before the first positioner arrives at the queue position.

In Example 3, the subject matter of Examples 1-2 includes, wherein the first hopper includes a gate mechanism that is operative to advance the subject board at the queue position while the first positioner is in motion towards the fastening position and is moving a prior board to the fastening position.

In Example 4, the subject matter of Examples 1-3 includes, a second positioner arranged to move between a pre-queued position and the queue position, wherein the pre-queue position is to receive a second board from a second hopper; and wherein the first positioner, when at the queue position, is to movably engage with the second board and to initiate movement of the second board to the fastening position.

In Example 5, the subject matter of Example 4 includes, wherein the second board is of a different size than the subject board.

In Example 6, the subject matter of Examples 1-5 includes, wherein the first positioner includes a plate having a width equal to or greater than a length of the board.

In Example 7, the subject matter of Examples 1-6 includes, wherein the first hopper includes adjustable length and width to accommodate different board sizes.

In Example 8, the subject matter of Example 7 includes, wherein the first hopper includes a board width-adjustment plate coupled to a parallelogram linkage.

In Example 9, the subject matter of Examples 1-8 includes, a system of actuated board guides including guide surfaces autonomously movable between a deployed position and a retracted position, wherein in the deployed position the guide surfaces are situated effectively to mechanically engage with the subject board to align the subject board at the queue position, and wherein in the retracted position the guide surfaces do not mechanically engage with the subject board.

In Example 10, the subject matter of Example 9 includes, wherein the system of actuated board guides is operative to retract the guide surfaces during advancement of the subject board at the queue position, and to deploy the guide surfaces upon completion of the advancement of the subject board at the queue position.

In Example 11, the subject matter of Example 10 includes, wherein the completion of the advancement of the subject board is autonomously determined by detection of cessation of movement of the subject board above a defined threshold at the queue position.

In Example 12, the subject matter of Examples 9-11 includes, wherein the guide surfaces are movable between the deployed and the retracted positions along directions perpendicular to directions of movement of the first positioner between the queue position and the fastening position.

In Example 13, the subject matter of Examples 1-12 includes, a fastening system, including a nailer, and a nail delivery system, wherein: the nailer comprises a nailing chamber and a nail driver coupled to a nailing actuator operative to cause the nail driver to perform a driving cycle that includes driving a nail that is in the nailing chamber through the subject board when the subject is in the fastening position and thereafter resetting the nailing chamber, the nailing actuator being responsive to a nail-drive actuation signal to start the driving cycle; and the nail delivery system comprises a nail queue proximate the nailing chamber, and a nail picker coupled to a picker actuator arranged to cause the nail picker to feed the nail from the nail queue into the nailing chamber, the picker actuator being responsive to a pick signal, wherein the pick signal is distinct from the nail-drive actuation signal.

In Example 14, the subject matter of Example 13 includes, wherein the pick signal is timed to activate the picker actuator before completion of the driving cycle.

Example 15 is a board positioning system (BPS) for use with a pallet assembly system, comprising: a first hopper for holding boards to be fastened to a pallet under assembly; a first positioner movable under the first hopper between a retracted position and an extended position, the first positioner arranged to move a subject board from a queue position to a fastening position, wherein the fastening position is aligned with a fastening actuator operable to fasten the subject board to the pallet under assembly; wherein the first hopper includes, a gate mechanism arranged to advance the subject board at the queue position while the first positioner is in motion between the queue position and the fastening position and before the first positioner movably engages with the subject board; wherein the first positioner, when at the queue position, is to movably engage with the subject board and to initiate movement of the subject board to the fastening position; and wherein the BPS further includes a sensor and a controller configured to monitor a positional movement condition of the subject board during advancement of the subject board at the queue position, and to permit initiation of the movement the subject board to the fastening position only in response to the positional movement condition meeting movement criteria.

In Example 16, the subject matter of Example 15 includes, wherein the positional movement condition is a vibration condition.

In Example 17, the subject matter of Examples 15-16 includes, wherein the movement criteria includes a threshold defined as a rate of change of movement of a board subject to positional-movement monitoring.

Example 18 is a machine-implemented method for automatically assembling a pallet, the method comprising: placing a subject board from a source location to a queue position; moving the subject board from the queue position to a fastening position by a positioner, wherein at the fastening position the subject board is fastened to a pallet under assembly; wherein placing the subject board occurs while the positioner is in motion between the queue position and the fastening position; and wherein the queue position is on a surface of the positioner.

In Example 19, the subject matter of Example 18 includes, after initiation of moving the subject board from the queue position to the fastening position, placing a second board to the queue position, wherein the second board is a different size than the first board; and moving the second board from the queue position to the fastening position by the positioner.

In Example 20, the subject matter of Examples 18-19 includes, wherein placing the subject board to the queue position includes permitting the subject board to slidably interact with the surface of the positioner.

In Example 21, the subject matter of Examples 18-20 includes, wherein placing the subject board to the queue position occurs during forward motion of the positioner toward the fastening position.

In Example 22, the subject matter of Examples 18-21 includes, wherein placing the subject board to the queue position occurs during forward motion of the positioner toward the fastening position and during reverse motion of the positioner toward the queue position.

Example 23 is a machine-implemented method for automatically assembling a pallet, the method comprising: placing a subject board from a source location to a queue position; moving the subject board from the queue position to a fastening position by a positioner, wherein at the fastening position the subject board is fastened to a pallet under assembly; during placing of the subject board to the queue position, monitoring a positional movement condition of the subject board; computationally determining whether the positional movement condition meets defined movement criteria; and permitting initiation of the movement the subject board from the queue position to the fastening position only in response to the meeting of the movement criteria by the positional movement.

In Example 24, the subject matter of Example 23 includes, wherein placing the subject board occurs while the positioner is in motion between the queue position and the fastening position.

In Example 25, the subject matter of Examples 23-24 includes, wherein the queue position is on a surface of the positioner.

In Example 26, the subject matter of Examples 23-25 includes, wherein the positional movement condition is a vibration condition.

In Example 27, the subject matter of Examples 23-26 includes, wherein the movement criteria includes a threshold defined as a rate of change of movement of a board subject to positional-movement monitoring.

Example 28 is at least one machine-readable medium including instructions that, when executed by processing circuitry, cause the processing circuitry to perform operations, in conjunction with machinery means, to implement of any of Examples 1-27.

Example 29 is a system comprising means to implement of any of Examples 1-27.

The embodiments above are intended to be illustrative and not limiting. Additional embodiments are within the claims. In addition, although aspects of the present invention have been described with reference to particular embodiments, those skilled in the art will recognize that changes may be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112(f) of 35 U.S.C. are not to be invoked unless the specific terms "means for" or "step for" are recited in a claim.

What is claimed is:

1. A board positioning system (BPS) for use with a pallet assembly system, comprising:
    a first hopper for holding boards to be fastened to a pallet under assembly; and
    a first positioner movable under the first hopper between a retracted position and an extended position, the first positioner arranged to move a subject board from a queue position to a fastening position, wherein the fastening position is aligned with a fastening actuator operable to fasten the subject board to the pallet under assembly;
    wherein the first hopper is operative to advance the subject board at the queue position while the first positioner is in motion between the queue position and the fastening position and before the first positioner movably engages with the subject board;

wherein the queue position is on a surface of the first positioner; and wherein the first positioner, when at the queue position, is operative to movably engage with the subject board and to initiate movement of the subject board to the fastening position.

2. The BPS of claim 1, wherein the first hopper includes a gate mechanism operative to advance the subject board at the queue position such that the subject board slides along a top surface of the first positioner while the first positioner is in motion and before the first positioner arrives at the queue position.

3. The BPS of claim 1, wherein the first hopper includes a gate mechanism operative to advance the subject board at the queue position while the first positioner is in motion towards the fastening position and is moving a prior board to the fastening position.

4. The BPS of claim 1, further comprising:

a second positioner arranged to move between a pre-queued position and the queue position, wherein the pre-queue position is to receive a second board from a second hopper; and wherein the first positioner, when at the queue position, is to movably engage with the second board and to initiate movement of the second board to the fastening position.

5. The BPS of claim 4, wherein the second board is of a different size than the subject board.

6. The BPS of claim 1, wherein the first positioner includes a plate having a width equal to or greater than a length of the board.

7. The BPS of claim 1, wherein the first hopper includes adjustable length and width to accommodate different board sizes.

8. The BPS of claim 7, wherein the first hopper includes a board width-adjustment plate coupled to a parallelogram linkage.

9. The BPS of claim 1, further comprising:

a system of actuated board guides including guide surfaces autonomously movable between a deployed position and a retracted position, wherein in the deployed position the guide surfaces are situated effectively to mechanically engage with the subject board to align the subject board at the queue position, and wherein in the retracted position the guide surfaces do not mechanically engage with the subject board.

10. The BPS of claim 9, wherein the system of actuated board guides is operative to retract the guide surfaces during advancement of the subject board at the queue position, and to deploy the guide surfaces upon completion of the advancement of the subject board at the queue position.

11. The BPS of claim 10, wherein the completion of the advancement of the subject board is autonomously determined by detection of cessation of movement of the subject board above a defined threshold at the queue position.

12. The BPS of claim 9, wherein the guide surfaces are movable between the deployed and the retracted positions along directions perpendicular to directions of movement of the first positioner between the queue position and the fastening position.

13. The BPS of claim 1, further comprising:

a fastening system, including a nailer, and a nail delivery system, wherein:

the nailer comprises a nailing chamber and a nail driver coupled to a nailing actuator operative to cause the nail driver to perform a driving cycle that includes driving a nail that is in the nailing chamber through the subject board when the subject is in the fastening position and thereafter resetting the nailing chamber, the nailing actuator being responsive to a nail-drive actuation signal to start the driving cycle; and the nail delivery system comprises a nail queue proximate the nailing chamber, and a nail picker coupled to a picker actuator arranged to cause the nail picker to feed the nail from the nail queue into the nailing chamber, the picker actuator being responsive to a pick signal, wherein the pick signal is distinct from the nail-drive actuation signal.

14. The BPS of claim 13, wherein the pick signal is timed to activate the picker actuator before completion of the driving cycle.

15. A board positioning system (BPS) for use with a pallet assembly system, comprising:

a first hopper for holding boards to be fastened to a pallet under assembly;

a first positioner movable under the first hopper between a retracted position and an extended position, the first positioner arranged to move a subject board from a queue position to a fastening position, wherein the fastening position is aligned with a fastening actuator operable to fasten the subject board to the pallet under assembly;

wherein the first hopper includes a gate mechanism arranged to advance the subject board at the queue position while the first positioner is in motion between the queue position and the fastening position and before the first positioner movably engages with the subject board;

wherein the first positioner, when at the queue position, is to movably engage with the subject board and to initiate movement of the subject board to the fastening position; and wherein the BPS further includes a sensor and a controller configured to monitor a positional movement condition of the subject board during advancement of the subject board at the queue position, and to permit initiation of the movement the subject board to the fastening position only in response to the positional movement condition meeting movement criteria.

16. The BPS of claim 15, wherein the positional movement condition is a vibration condition.

17. The BPS of claim 15, wherein the movement criteria includes a threshold defined as a rate of change of movement of a board subject to positional-movement monitoring.

18. A machine-implemented method for automatically assembling a pallet, the method comprising:

placing a subject board from a source location to a queue position;

moving the subject board from the queue position to a fastening position by a positioner, wherein at the fastening position the subject board is fastened to a pallet under assembly;

wherein placing the subject board occurs while the positioner is in motion between the queue position and the fastening position; and wherein the queue position is on a surface of the positioner.

19. The method of claim 18, further comprising:

after initiation of moving the subject board from the queue position to the fastening position, placing a second board to the queue position, wherein the second board is a different size than the first board; and moving the second board from the queue position to the fastening position by the positioner.

20. The method of claim 18, wherein placing the subject board to the queue position includes permitting the subject board to slidably interact with the surface of the positioner.

21. The method of claim 18, wherein placing the subject board to the queue position occurs during forward motion of the positioner toward the fastening position.

22. The method of claim 18, wherein placing the subject board to the queue position occurs during forward motion of the positioner toward the fastening position and during reverse motion of the positioner toward the queue position.

* * * * *